US012808261B2

(12) United States Patent
Lewan et al.

(10) Patent No.: US 12,808,261 B2
(45) Date of Patent: Nov. 24, 2026

(54) METHODS AND APPARATUS TO OPERATE POWERED DOORS

(71) Applicant: RITE-HITE HOLDING CORPORATION, Milwaukee, WI (US)

(72) Inventors: Derek Lewan, Hazel Green, WI (US); Steven Hart Campbell, Peosta, IA (US); Michael Moore, Dubuque, IA (US); Thomas Jansen, Dubuque, IA (US); Thomas Leibfried, Potosi, WI (US); Ryan Pfaff, Dubuque, IA (US); Perry Knutson, Lancaster, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 471 days.

(21) Appl. No.: 17/738,639

(22) Filed: May 6, 2022

(65) Prior Publication Data

US 2022/0356758 A1 Nov. 10, 2022

Related U.S. Application Data

(60) Provisional application No. 63/185,922, filed on May 7, 2021.

(51) Int. Cl.
*E06B 9/58* (2006.01)
*E06B 9/56* (2006.01)

(52) U.S. Cl.
CPC ................ *E06B 9/581* (2013.01); *E06B 9/56* (2013.01); *E06B 9/58* (2013.01); *E06B 2009/587* (2013.01)

(58) Field of Classification Search
CPC ...... E06B 9/581; E06B 9/58; E06B 2009/585; E06B 2009/587; E06B 9/56
See application file for complete search history.

(56) References Cited

U.S. PATENT DOCUMENTS 797,652 A 8/1905 Wilson et al.
3,734,161 A * 5/1973 Pierce ........................ E06B 9/60 160/40

(Continued)

FOREIGN PATENT DOCUMENTS

EP 1882806 A1 * 1/2008 ......... E06B 9/17061
GB 2137271 4/1984

(Continued)

OTHER PUBLICATIONS

Translation of EP_1882806 (Year: 2008).*

(Continued)

*Primary Examiner* — Daniel P Cahn
*Assistant Examiner* — John W Hanes, Jr.
(74) *Attorney, Agent, or Firm* — Hanley, Flight & Zimmerman, LLC

(57) ABSTRACT

A door system includes a panel, and a track including a first track wall and a second track wall opposite the first track wall. The first and second track walls define a channel therebetween. A lateral edge of the panel is to move along the channel as the panel moves between a closed position and an open position. The door system further includes a first refeed block to be aligned with the first track wall. The first refeed block is to extend a first distance above the first track wall. The door system also includes a second refeed block to be aligned with the second track wall. The second refeed block is to extend a second distance above the second track wall. The first distance greater than the second distance.

15 Claims, 17 Drawing Sheets

(56) References Cited

U.S. PATENT DOCUMENTS 4,018,259 A * 4/1977 Herms .................... E06B 9/68 160/133
4,601,320 A 7/1986 Taylor
5,058,651 A * 10/1991 Ashley .................... E06B 9/581 160/271
5,381,846 A 1/1995 Lichy
5,460,216 A * 10/1995 Hirao .................... E06B 9/17 160/133
5,482,104 A * 1/1996 Lichy .................... E06B 9/13 160/273.1
5,887,385 A * 3/1999 Horner .................... E06B 9/581 49/197
5,964,270 A 10/1999 Kirkey et al.
6,085,822 A * 7/2000 Miller .................... E06B 9/58 160/183
6,397,921 B1 6/2002 Wartenbergh
6,574,832 B1 * 6/2003 Boerger .................... E06B 9/581 16/DIG. 1
6,722,416 B2 * 4/2004 Varley .................... E06B 9/70 160/264
6,883,577 B2 * 4/2005 Frede .................... E06B 9/56 160/133
6,942,003 B2 * 9/2005 Thompson .................... E06B 9/13 160/273.1
7,045,764 B2 * 5/2006 Beggs .................... E06B 9/68 250/221
7,131,481 B2 11/2006 Varley et al.
7,389,807 B2 * 6/2008 Nagare .................... E06B 9/13 160/273.1
7,516,770 B2 4/2009 Jerry
7,757,437 B2 * 7/2010 Schulte .................... E05D 15/1021 49/411
8,037,921 B2 * 10/2011 Dondlinger .................... E06B 9/581 160/264
8,113,265 B2 * 2/2012 Hardison, III .................... E06B 9/58 160/44
8,333,229 B2 * 12/2012 Kimener .................... E06B 9/58 160/242
8,360,132 B2 * 1/2013 Drifka .................... E06B 9/13 160/195
8,678,070 B2 * 3/2014 Kimener .................... E05D 11/0009 160/266
8,863,815 B2 * 10/2014 Jansen .................... E06B 9/13 160/264
9,097,053 B2 * 8/2015 Drifka .................... E06B 9/581
9,388,634 B2 * 7/2016 Hardison, III .................... E06B 9/86
9,493,984 B2 * 11/2016 Casey .................... E06B 9/581
9,771,225 B2 * 9/2017 Stone .................... B60Q 3/76
9,909,358 B2 * 3/2018 Ungs .................... E06B 9/13
9,957,749 B2 * 5/2018 Frede .................... E06B 9/15
10,006,244 B2 * 6/2018 Balay .................... E06B 9/17076
10,358,858 B2 * 7/2019 Lietz .................... E06B 9/68
10,794,116 B2 * 10/2020 Kanuri .................... E06B 9/88
10,844,657 B2 * 11/2020 Fleischman .................... E06B 9/174
11,142,946 B2 * 10/2021 McNabb .................... E06B 9/582
12,006,767 B2 * 6/2024 Beggs .................... E06B 9/68
2003/0173040 A1 * 9/2003 Court .................... E06B 9/58 160/264
2004/0020611 A1 * 2/2004 Coenraets .................... E06B 9/13 160/188
2005/0067118 A1 * 3/2005 Coenrates .................... E06B 9/581 160/267.1
2005/0211391 A1 * 9/2005 Varley .................... E06B 9/70 160/310
2005/0211397 A1 * 9/2005 Coenraets .................... E06B 9/582 160/271
2007/0277941 A1 * 12/2007 Jansen .................... E06B 9/13 160/271
2008/0196842 A1 * 8/2008 Schoeren .................... E06B 9/581 160/133
2009/0236053 A1 * 9/2009 Kimener .................... E06B 9/17076 160/293.1
2010/0032105 A1 * 2/2010 Drifka .................... E05D 15/165 160/310
2012/0073206 A1 * 3/2012 Kimener .................... E05D 11/0009 49/404
2013/0306252 A1 * 11/2013 Lambridis .................... E06B 9/582 160/133
2014/0158313 A1 * 6/2014 McTavish .................... E06B 9/58 160/270
2014/0305600 A1 * 10/2014 Casey .................... E06B 9/581 160/405
2014/0345812 A1 * 11/2014 Casey .................... E06B 9/13 160/405
2015/0197985 A1 * 7/2015 Balay .................... E06B 9/58 160/271
2016/0032646 A1 * 2/2016 Fleischman .................... E06B 9/68 16/96 R
2016/0090777 A1 * 3/2016 Brunton .................... E06B 3/38 160/133
2016/0108666 A1 * 4/2016 Lewan .................... E06B 9/58 160/271
2016/0177624 A1 * 6/2016 Palencia .................... E06B 9/70 160/267.1
2016/0348429 A1 * 12/2016 Frede .................... E06B 9/15
2016/0348430 A1 * 12/2016 Lorenzani .................... E06B 9/13
2017/0067285 A1 * 3/2017 Lambridis .................... E06B 9/581
2017/0101818 A1 * 4/2017 Frede .................... E06B 9/58
2017/0356239 A1 * 12/2017 Ouyang .................... E06B 9/80
2019/0048658 A1 * 2/2019 Garcia Hernandez .... E06B 9/44
2019/0178032 A1 * 6/2019 McNabb .................... E06B 9/17076
2019/0360265 A1 * 11/2019 Kanuri .................... E06B 9/58
2021/0071476 A1 * 3/2021 Beggs .................... E06B 9/68
2021/0262284 A1 * 8/2021 James .................... E06B 9/581
2022/0195796 A1 * 6/2022 Zimmermann .................... E06B 9/58
2022/0356742 A1 * 11/2022 Beggs .................... E06B 9/86
2022/0356758 A1 * 11/2022 Lewan .................... E06B 9/13

FOREIGN PATENT DOCUMENTS

JP 2015169027 A 9/2015
WO 2008127327 A1 10/2008

OTHER PUBLICATIONS

International Searching Authority, "International Preliminary Report on Patentability," issued in connection with International Patent Application No. PCT/US2022/028128, mailed Oct. 24, 2023, 15 pages.

International Searching Authority, "International Search Report and Written Opinion," issued in connection with International Application No. PCT/US2022/028128, mailed on Oct. 31, 2022, 24 pages.

International Searching Authority, "Invitation to Pay Additional Fees," issued in connection with International Application No. PCT/US2022/028128, mailed on Sep. 8, 2022, 20 pages.

European Patent Office, "Communication under Rule 71(3) EPC," issued in connection with European Patent Application No. 22725672.4, dated Jun. 15, 2026, 9 pages.

* cited by examiner

METHODS AND APPARATUS TO OPERATE POWERED DOORS

RELATED APPLICATION

This patent claims priority to U.S. Provisional Patent Application No. 63/185,922, which was filed on May 7, 2021, and which is hereby incorporated herein by reference in its entirety.

FIELD OF THE DISCLOSURE

This disclosure relates generally to powered doors, and, more particularly, to methods and apparatus to operate powered doors.

BACKGROUND

Some powered doors have a pliable panel or curtain that moves vertically or horizontally to open or block a doorway or other passageway. Often, such door panels are guided during movement by edges of the panels being retained within tracks that extend along the associated doorway. Various sensors can be used to determine the position of the door panel and/or other conditions associated with the door.

Figure 1:
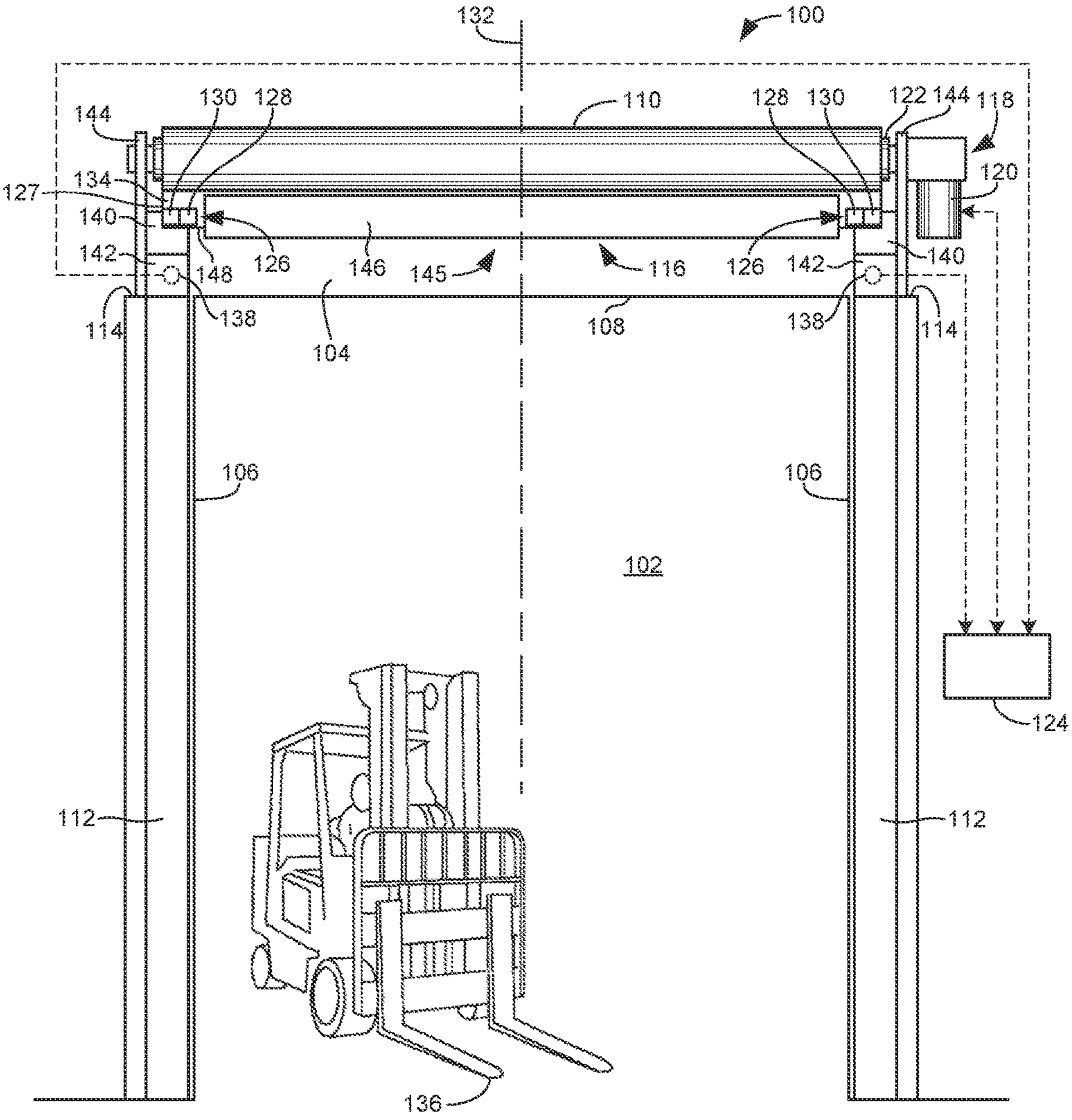
FIG. 1 illustrates an example door system with an example door panel in an open position.

The figures are not necessarily to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

FIGS. 1-5 show an example door system 100 to selectively block and unblock a doorway 102 in a building wall 104 that is defined by two lateral sides 106 and an upper edge 108. Under normal door operation, a curtain or panel 110 travels along first and second guides or tracks 112 mounted to the wall 104 adjacent the lateral sides 106 of the doorway 102. In this examples, upper ends 114 of the tracks 112 are substantially aligned with the upper edge 108 of the doorway 102 (e.g., the lintel). In other examples, the upper ends 114 of the tracks 112 are above or below the height of the upper edge 108 of the doorway 102.

To operate the door system 100 in the illustrated example, the door system 100 includes a motorized drive unit 118 that includes a motor 120 rotating a drum or roller 122 about which the panel 110 is wrapped and unwrapped as the panel 110 moves between opened and closed positions. Depending on the direction of rotation, as determined by a controller 124, the roller 122 selectively draws the panel 110 up to uncover or unblock the doorway 102 or pays out the panel 110 to lower the panel 110 to cover or block the doorway 102. In some examples, when lowering the panel 110, the roller 122 controllably releases the panel 110 while the weight of the panel 110 helps pull the panel 110 downward.

In the illustrated example of FIG. 1, the panel 110 is in a fully open position in which a leading edge 116 of the panel 110 is above the upper ends 114 of the tracks 112 and the upper edge 108 of the doorway 102. In the illustrated example of FIG. 2, the panel 110 is in a fully closed position in which the leading edge 116 of the panel 110 rests upon the floor.

In some examples, to help guide the vertical movement of the panel 110 along the tracks 112, guide members 126 are distributed along lateral edges 127 of the door panel 110. In some examples, the guide members 126 are spaced relatively far apart (e.g., at 5 inches apart, at 9 inches apart, at least 12 inches apart, etc.). In the illustrated example, each guide member 126 includes two portions including a wear resistant portion 128 (also referred to herein as a wear resistant tab 128) and a lateral retention portion 130 (also referred to herein as a lateral retention tab 130). Further, in some examples, each guide member 126 includes separate wear resistant tabs 128 and separate lateral retention tabs 130 on either side of the door panel 110. That is, in some examples, the panel 110 is sandwiched between separate tabs 128, 130 on either side, as shown in the cross-sectional view of FIG. 3. In this example, the corresponding wear resistant tabs 128 and corresponding lateral retention tabs 130 are connected to each other on opposites sides of the panel 110 via one or more fasteners 302 (e.g., screws, bolts, rivets, etc.) extending through corresponding holes in the panel 110.

As shown in the illustrated example, the wear resistant tabs 128 are positioned to be closer to a central vertical axis 132 of the door panel 110 than the lateral retention tabs 130 (which are proximate the lateral edges 127 of the door panel 110). More particularly, as most clearly shown in FIG. 3, the wear resistant tabs 128 are positioned to be partially outside of the tracks 112 and partially inside of the tracks 112. By contrast, the lateral retention tabs 130 are positioned entirely inside an interior channel 304 of the track 112 defined between a first track wall 306 and a second track wall 308. In this example, the first track wall 306 is positioned closer to the building wall 104 than the door panel 110, whereas the second track wall 308 is positioned farther away from the building wall 104 than the door panel 110. In the illustrated example, the separate track walls 306, 308 are separately formed and subsequently bolted together to form the complete track 112. In other examples, the track walls 306, 308 are secured to one another in any suitable manner (e.g., via welding). In other examples, the track walls 306, 308 are formed as a unitary piece of material.

Figure 3:
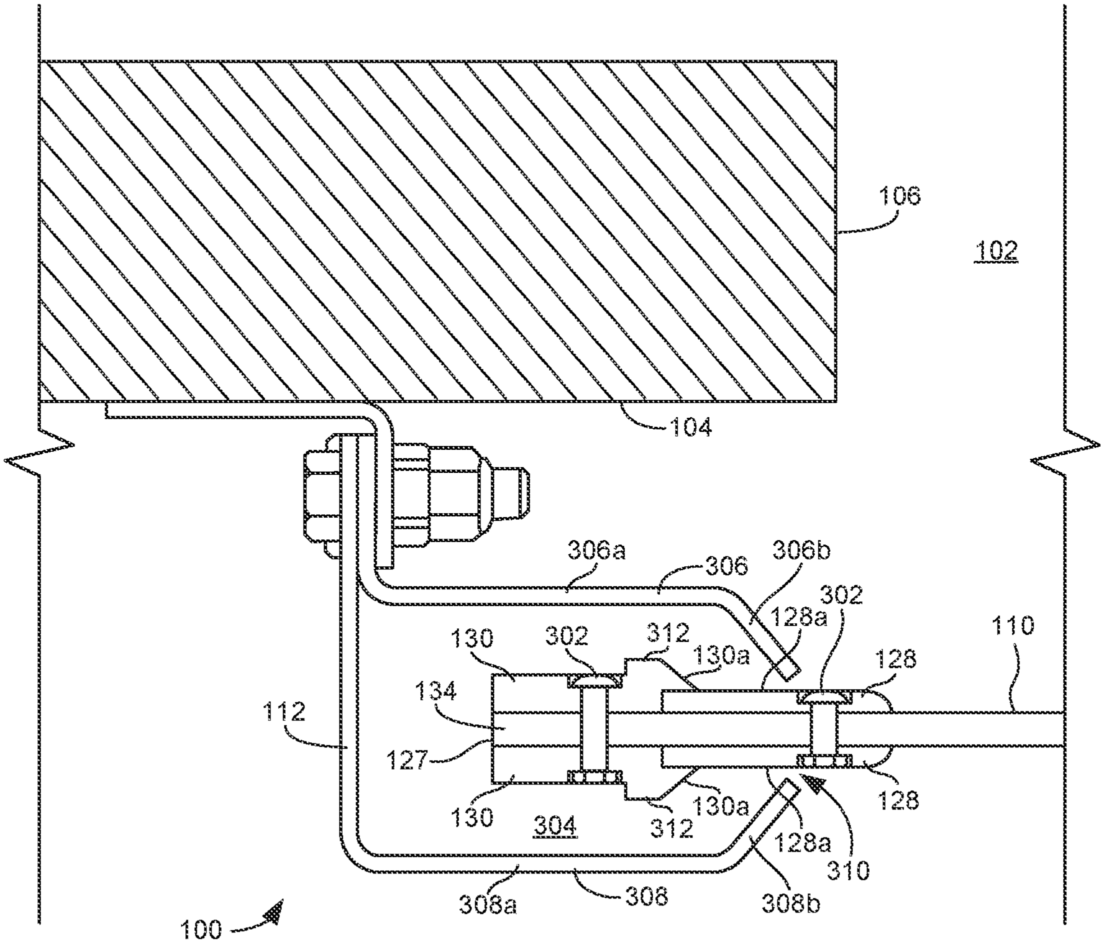
FIG. 3 illustrates a cross-sectional view of the example door panel within an example track taken along line 3-3 of FIG. 2.

As shown in FIG. 3, the first and second track walls 306, 308 are dimensioned relative to one another to define an opening 310 through which the panel 110 extends into the interior channel 304. More particularly, in some examples, the first and second track walls 306, 308 include corresponding first and second main portions **306*a*, 308*a* and corresponding first and second end portions 306*b*, 308*b*. In this example, the first and second main portions 306*a*, 308*a* are approximately parallel and face one another. The first and second end portions 306*b*, 308*b* are angled relatively to the corresponding first and second main portions 306*a*, 308*a*. In this example, the first and second end portions 306*b*, 308*b* are angled so as to extend towards one another, thereby defining the opening 310 extending therebetween to be less than a distance between the main portions 306*a*, 308*a* of the track walls 306, 308. In some examples, the opening 310 is dimensioned to be larger than a combined thickness of a main body 134 of the panel 110 and the opposing pair of wear resistant tabs 128. Thus, as noted above, the wear resistant tabs 128 can extend through the opening to be partially within the channel 304 and partially outside of the track 112. In some examples, the wear resistant tabs 128 are positioned to extend through the opening 310 so that a contact surface 128*a* of the wear resistant tabs 128 facing away from the panel 110 contacts the ends of the track walls 306, 308 at the opening 310 to protect the panel 110 from rubbing against the track 112 during normal operation, thereby reducing wear on the panel 110 and reduce the workload of the motor 120. In particular, in some examples, the panel 110 is made of rubber, which has a relatively high coefficient of friction, such that the panel 110 rubbing against the track 112 can result in significant wear and increase the load on the motor 120. Accordingly, in some examples, the wear resistant tabs 128 are made of a different material than the panel 110 with a lower coefficient of friction. For instance, in some examples, the wear resistant tabs 128** are made of ultra-high molecular weight (UHMW) plastic.

Figure 4:
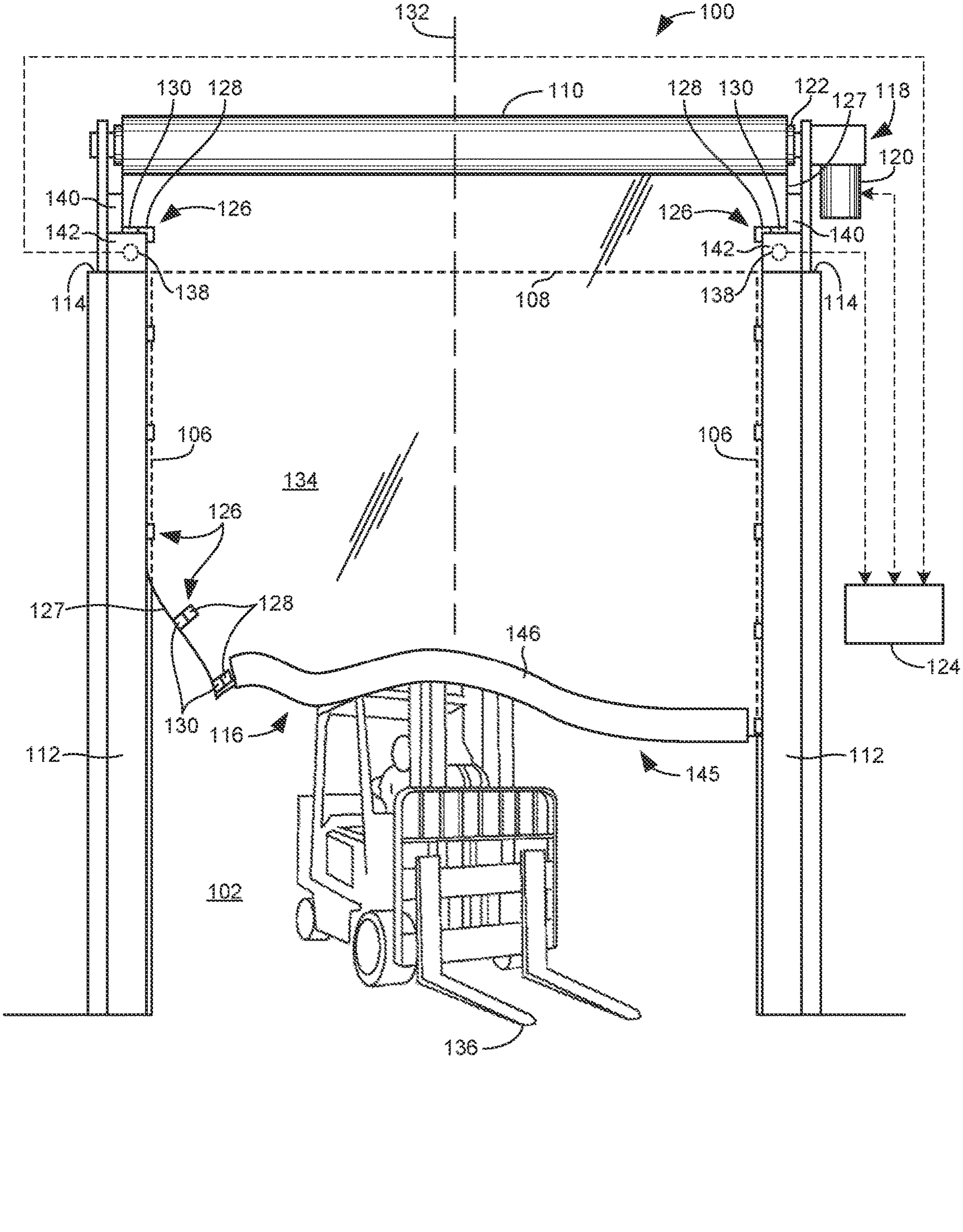
FIG. 4 illustrates the example door system of FIG. 1 when in an example breakaway state with the example door panel at a partially open position.

In some examples, adjacent ones of the wear resistance tabs 128 along a length of the panel 110 are spaced apart by an appreciable distance (e.g., a distance that is multiple times a width of individual ones of the wear resistance tabs 128) as shown most clearly in FIG. 4. Thus, in some examples, there is no protective material between exposed portions of the panel 110 (between adjacent wear resistance tabs 128) and the ends of the track walls 306, 308 at the opening 310 through which the panel 110 extends. However, due to the thickness of the wear resistance tabs 128, the exposed portions of the panel 110 between adjacent ones of the tabs 128 are nevertheless maintained separated from the track walls 306, 308 under most normal operations, thereby reducing (e.g., avoiding) wear on the panel 110. In some examples, the thickness of the wear resistance tabs 128 can be any suitable distance (e.g., at least ⅛ inch, at least ¼ inch, at least ½ inch, etc.). In some examples, the thickness of the wear resistance tabs 128 is designed to be sufficient to enable a fastener (e.g., the fastener 302) to be countersunk within the tabs 128 with enough underlying material to stop pull through or other failures.

As noted above, the lateral retention tabs 130 are positioned entirely within the channel 304. In some examples, the lateral retention tabs 130 are positioned to be spaced apart from inner surfaces of the track walls 306, 308. As a result, as the panel 110 moves up or down along the tracks 112, engagement between the lateral retention tabs 130 and the tracks 112 is reduced (e.g., minimized), thereby reducing (e.g., minimizing) friction and wear on the parts. However, in some instances, a load acting on panel 110 in a direction transverse to the vertical direction of travel (e.g., a wind load or force) can cause the panel 110 to bow and urge the lateral edges 127 of the panel 110 towards the central vertical axis 132. In this example, the lateral retention tabs 130 include a protrusion 312 and/or are otherwise dimensioned to be wider than the opening 310 of the track 112. That is, the distance between corresponding surfaces on each tab 130 farthest away from the main body 134 of the panel 110 is greater than width of the opening 310. As a result, if the lateral edges 127 of the panel 110 are urged towards the central vertical axis 132 of the door panel 110, a contact surface 130*a* of the protrusions 312 will come in contact with the inner surfaces of the track walls 306, 308, thereby retaining the lateral edges 127 of the panel 110 within the channel 304. In some examples, the lateral retention tabs 130 are made of a different material than the wear resistant tabs 128 due to the different purposes to which the different tabs are employed. In particular, as noted above, the wear resistant tabs 128 are made from a material selected to serve the purpose of reducing friction and/or abrasion and the resulting effects on wear. By contrast, the lateral retention tabs 130 are made from a material selected for its strength to withstand wind loads and/or other forces that may urge the door panel 110 out of the tracks 112. Thus, in some examples, the wear resistant tabs 103 are made of a material (e.g., UHMW plastic) that is more wear resistant and/or has a lower coefficient of friction than the lateral retention tabs 130, whereas the lateral retention tabs 130 are made of a material (e.g., nylon) that is stronger than the wear resistant tabs 128. Further details regarding the design and construction of the tabs 128, 130 and alternative example tabs are provided below in connection with FIGS. 10-14.

In some examples, if the force urging the lateral edges 127 of the panel 110 out of the tracks 112 and toward the central vertical axis 132 is strong enough, the track walls 306, 308 are designed to flex apart to allow the lateral retention tabs 130 to pass through the opening along with the lateral edge 127 of the door panel 110 to break away from the track 112. In this manner, significant damage to the components of the example door system 100 is reduced (e.g., avoided). In some examples, the contact surface 130*a* of the retention tab 130 facing toward the central vertical axis 132 is angled (e.g., 120 degrees, 125 degrees, 130 degrees, 135 degrees, 140 degrees from the contact surface 128*a* of the wear tab 128) such that it is substantially parallel (e.g., within +/−5 degrees) to the inner surface of the angled portion of the track walls 306, 308. In some examples, rather than the track walls 306, 308 flexing to enable the lateral retention tabs 130 to escape through the opening 310 during such a breakaway event, the tracks walls 306, 308 support flexible retention strips on either side of the opening to retain the lateral retention tabs 130 within the channel 304 under relatively small loads acting on the panel 110 and lateral retention tabs 130 to escape the track 112 under higher loads while reducing (e.g., avoiding) damage to components of the example door system 100. In alternative examples, the track walls 306, 308 may be more rigid and the retention tabs 130 may be resiliently flexible (e.g., angled sheet of metal, plastic, fiberglass) to enable a sufficient force to compress/deform the retention tab 130 to a dimension smaller than the opening 310 in response to a breakaway event.

As used herein, a breakaway event refers to an event in which one or more of the lateral retention tabs 130 is forced out of the channel 304 through the opening 310. As used herein, a breakaway state refers to the state of the door panel 110 following a breakaway event (e.g., when the leading edge 116 of the panel 110 is below the upper end 114 of the tracks 112). A common cause of a breakaway event is a forklift 136 or other material handling equipment impacting the door panel 110 as represented in the illustrated example of FIG. 4. In some examples, a breakaway event is detected by the controller 124 based on feedback from sensors 138 positioned at points aligned with the lateral edges 127 of the panel 110 and/or aligned with the location of the lateral retention tabs 130 when the panel 110 is operating under normal conditions. In the illustrated example, the sensors are located above the upper ends 114 of the tracks 112. In other examples, the sensors 138 may be located below the upper ends 114 of the tracks 112. In some examples, multiple sensors 138 may be positioned at different heights along the travel path of the panel 110.

In some examples, the sensors 138 are photo-eye sensors that send a beam across the travel path of the panel 110. Thus, if the leading edge 116 of the door panel is below the height of the sensors 138, the panel 110 crosses or interrupts the beam to trigger a signal that is transmitted to the controller 124. Additionally or alternatively, in some examples, a different signal is transmitted to the controller 124 when the panel 110 moves to a position in which the beam of the sensor 138 is not crossed or interrupted. If the leading edge 116 of the panel 110 is below the height of the sensors 138 (e.g., as determined by feedback from an encoder that monitors rotation of the motor 120 and/or the roller 122) at the time the controller 124 receives a signal indicating the beam of the sensor 138 is not crossed or is uninterrupted, the controller 124 infers that a breakaway event has occurred. This is demonstrated in the illustrated example of FIG. 5. Specifically, as shown in the illustrated example, the leading edge 116 of the panel 110 is below the sensors 138. However, due to the lateral edge 127 of the panel 110 being forced out of the track 112, as the panel 110 is raised to the open position, the displaced portion of the panel is spaced apart from the sensor 138 (on the left in FIG. 5) such that the beam produced by the sensor 138 becomes uncrossed or uninterrupted. The beam of the sensor 138 becoming uninterrupted triggers a signal that is transmitted to the controller 124 to, thereby, determine that a breakaway event has occurred.

In addition to detecting breakaway events, in some examples, the door system 100 is constructed to enable the panel 110 to be restored to a normal state from a breakaway state following a breakaway event. As used herein, a normal state of the panel 110 refers to the state of the panel 110 when the lateral edges 127 of the panel 110 are properly aligned with and inside the track 112 (assuming the leading edge 116 of the panel 110 is below the upper end 114 of the tracks 112) for normal operation.

In some examples, the panel 110 is restored to the normal state from a breakaway state by moving the panel 110 to the position (e.g., the fully open position) in which the leading edge 116 of the panel 110 is raised above the upper ends 114 of the tracks 112. By moving the panel 110 to this position, the panel 110 has clearance above the tracks 112 to realign the lateral edges 127 of the panel 110 with the tracks 112 to then be refed into the tracks 112 for normal operation. In some examples, the material characteristics of the panel 110 are such that the lateral edges 127 are urged outward (and in alignment with the tracks 112) as the panel 110 is moved to the open position without the need for a keder edge and/or an array of closely spaced (e.g., less than two inches) protrusions along the lateral edges 127 of the panel that may be pulled outward (e.g., by other structures such as rollers). Specifically, in some examples, the panel 110 (e.g., the main body 134 of the panel 110) is made of ¼ inch thick rubber. In other examples, the panel 110 is thicker or thinner than ¼ inch. Alternatively, or in addition, the panel material is resiliently flexible such that it tends from a curved (i.e., folded) toward a flatter (i.e., unfolded) planar shape.

Figure 5:
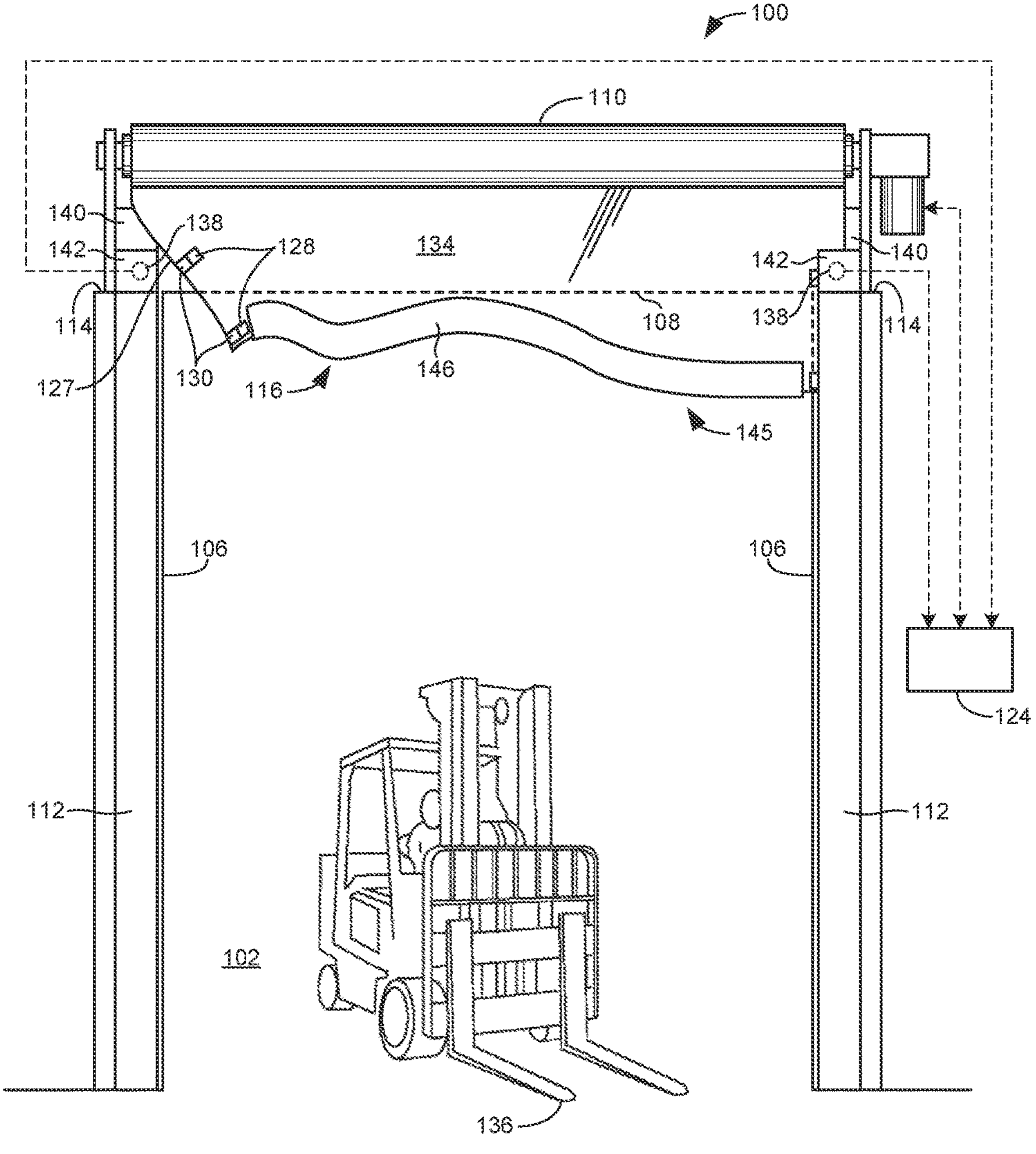
FIG. 5 illustrates the example door system of FIG. 1 when in the example breakaway state of FIG. 4 but with the example door panel moved closer to the open position.
Figure 6:
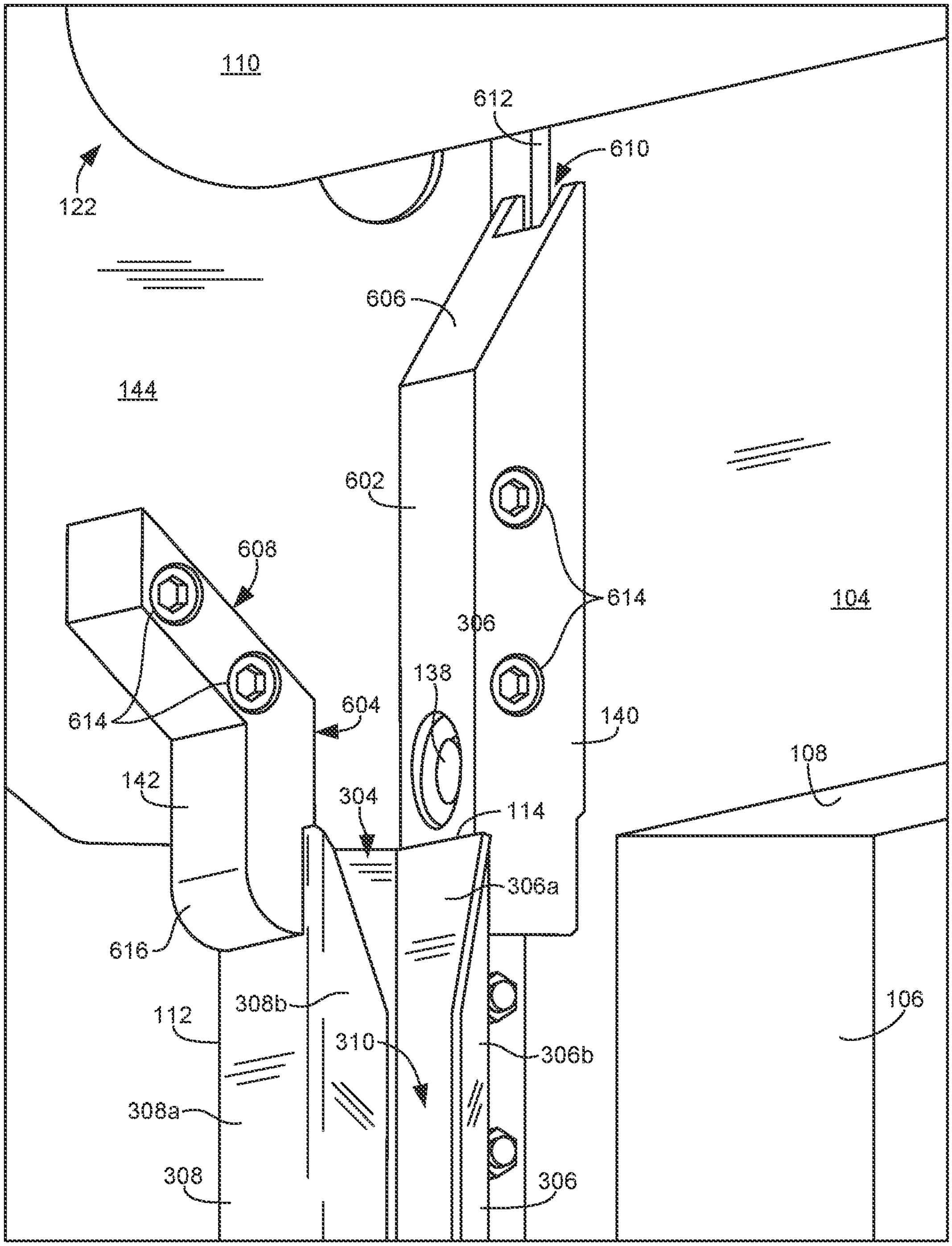
FIG. 6 is a perspective view of an example refeed assembly of the example door system of FIGS. 1-5.
Figure 7:
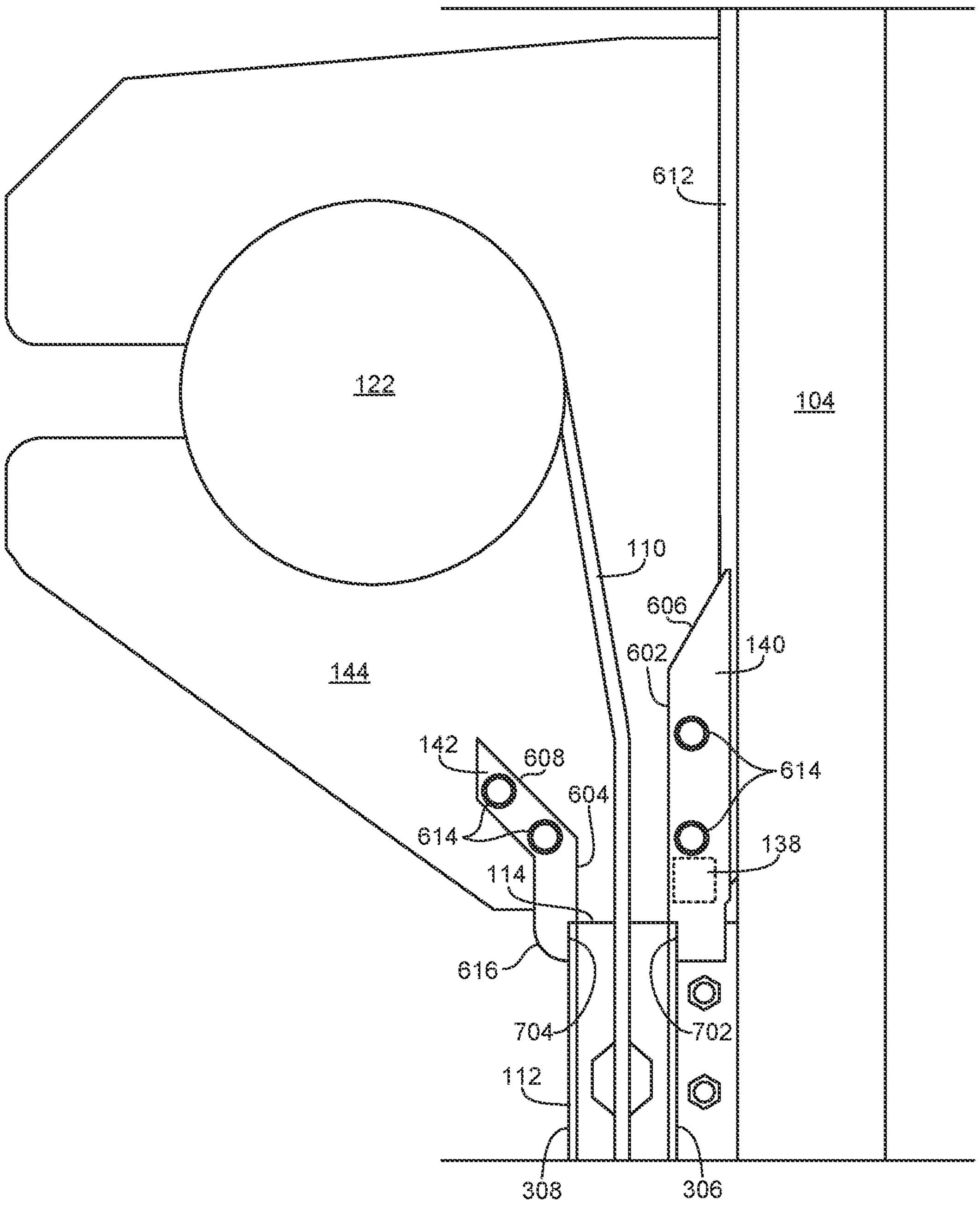
FIG. 7 is a cross-sectional side view of the example refeed assembly of FIG. 6.

In some examples, the door system 100 includes first and second refeed blocks 140, 142 positioned adjacent the upper end 114 of each track 112 to facilitate the panel 110 being restored to the normal state (FIGS. 1 and 2) from a breakaway state (FIGS. 4 and 5). The example refeed blocks 140, 142 can be implemented in the door system 100 that includes a door panel 110 having the tabs 128, 130, described above in connection with FIGS. 1-5. Further, the refeed blocks 140, 142 can be implemented in door systems with panels that do not include the tabs 128, 130. Further, the tabs 128, 130 can be implemented on door panels of door systems that do not include the refeed blocks 140, 142. In some examples, the refeed blocks 140, 142 are mounted to a side plate 144. In some examples, the side plate is coupled to and/or also supports the roller 122. A perspective view of the example refeed blocks 140, 142 adjacent one of the tracks 112 is illustrated in FIG. 6. A cross-sectional side view is illustrated in FIG. 7. As shown in the illustrated example, the refeed blocks 140, 142 are aligned with and extend upward from the track 112, thereby effectively vertically extending the channel 304 defined between the track walls 306, 308. More particularly, in this example, the first refeed block 140 is aligned with the first track wall 306 closest to the building wall 104 and the second refeed block 142 is aligned with the second track wall 308 farthest from the building wall 104. Thus, in this example, when the panel 110 is operating in the normal state, the panel 110 passes between the two refeed blocks 140, 142 with the first refeed block 140 being between the panel 110 and the building wall 104. In some examples, the first refeed block 140 has a first channel surface 602 that is positioned approximately or substantially flush (e.g., co-planar) with the inner surface of the first track wall 306 and the second refeed block 142 has a second channel surface 604 that is positioned approximately or substantially flush (e.g., co-planar) with the inner surface of the second track wall 308 to extend the height of the channel 304 above the track 112. As used herein, approximately flush or substantially flush means exactly flush or flush to within ⅛ of an inch. In this example, the refeed blocks 140, 142 include a stepped profile separating the channel surfaces 602, 604 from corresponding recessed surfaces 702, 704 (FIG. 7) with a width of the stepped portion approximately corresponding to the thickness of the track walls 306, 308. The stepped profile facilitates the positioning of the channel surfaces 602, 604 of the refeed blocks 140, 142 to be flush with the inner surfaces of the track walls 306, 308 by abutting the recessed surfaces 702, 704 against the outer surfaces of the track walls 306, 308.

In the illustrated example, the first refeed block 140 includes a first slanted surface 606 that angles upward and away from the first channel surface 602. Similarly, the second refeed block 142 includes a second slanted surface 608 that angles upward and away from the second channel surface 604. The slanted surfaces 606, 608 provide a funnel-like functionality to facilitate the redirection of the panel 110 that has been displaced out of alignment with the channel 304 due to a breakaway event. In some examples, the first slanted surface 606 on the first refeed block 140 is slanted at a steeper angle than the second slanted surface 608 on the second refeed block 142.

As shown in the illustrated examples, the first refeed block 140 (closest to the wall 104) is appreciably taller than the second refeed block 142. In some examples, the first refeed block 140 extends at least 20% higher or more (e.g., at least 30% higher, at least 50% higher, at least 100% higher (i.e., twice as high), etc.) above the upper end 114 of the track 112 than the second refeed block 142. In some examples, the upper limit of the first refeed block 140 extends substantially up to (e.g., within 2 inches of) the bottom of the roller 122 supporting the panel 110. In some examples, the first refeed block 140 extends above the bottom of the roller 122. The smaller height dimension of the second refeed block 140 (relative to the first refeed block 140) provides clearance above the second refeed block 140 for the panel 110 to move and reposition into alignment with the channel 304 following a breakaway event.

While the first refeed block 140 is taller than the second refeed block 142, in some examples, the second refeed block 142 is appreciably wider than the first refeed block 140 as measured in a direction substantially perpendicular to the panel 110 when in the closed position (e.g., perpendicular to the building wall 104). In other words, the second slanted surface 608 extends a farther distance away from the second channel surface 604 (in a direction perpendicular to the second channel surface) than the first slanted surface 606 extends away from the first channel surface 602. In some examples, the second slanted surface 608 of the second refeed block 142 extends a distance away from the second channel surface 604 that is at least 20% or more (e.g., at least 30%, at least 50%, at least 100% (i.e., twice the distance), etc.) than the first slanted surface 606 extends away from the first channel surface 602. The wider dimensions of the second refeed block 142 can serve to facilitate the redirection of the panel 110 being restored from a breakaway state by extending farther away from the wall 104 to more likely capture a free end of the panel 110. The resulting widened channel configuration adjacent the upper end 114 of the track 112 also enables reliable refeed function regardless of panel size (height) without requiring horizontal adjustment of the roller toward or away from the wall 104. In other words, the same header and refeed bracket arrangement (dimensions) can work for doors of various panel heights and/or sizes. The narrower dimensions of the first refeed block 142 enables the track 112 to be positioned closer to the building wall 104. In this example, the first refeed block 140 is at least wide enough to house the photo-eye sensor 138. Further, in some examples, the first refeed block includes a channel or groove 610 on a rear surface (opposite the channel surface 602). The groove 610 on the rear surface of the first refeed block 140 provides a channel along which wiring 612 for the sensor 138 can extend, thereby further serving to reduce the distance the track 112 needs to be spaced from the building wall 104.

In some examples, the upper end 114 of the main portions **306*a*, 308*a* of the first and second tracks 306, 308 are higher than upper ends of the end portions 306*b*, 308*b* of the tracks 306, 308. More particularly, as shown in FIG. 6, the upper ends of the end portions 306*b*, 308*b* are tapered to define a V-shaped entry into the opening 310. This V-shaped entry facilitates the refeeding of the panel 110 into the opening 310**.

Following a breakaway event, the portion of the panel 110 that is dislodged from the track 112 can flap or move about in an unexpected and/or seemingly random manner. Accordingly, in some examples, the refeed blocks 140, 142 are designed to reduce edges and/or protrusions that might catch on the free moving portion of the panel 110. For instance, as noted above, the refeed blocks 140, 142 are mounted to the side plate 144. More particularly, in this example, the refeed blocks 140, 142 are mounted using fasteners in countersunk or counterbored holes 614. In this manner, the heads of the fasteners do not protrude out from the refeed blocks 140, 142. Further, in some examples, the second refeed block 142 includes a rounded bottom outer edge 616 (rather than a rectangular or squared bottom). In other examples, the bottom outer edge 616 is slanted to avoid any hard (e.g., right angle) edges. Similarly, the other edges or corners on the refeed blocks 140, 142 can be rounded or smoothed.

Figure 8:
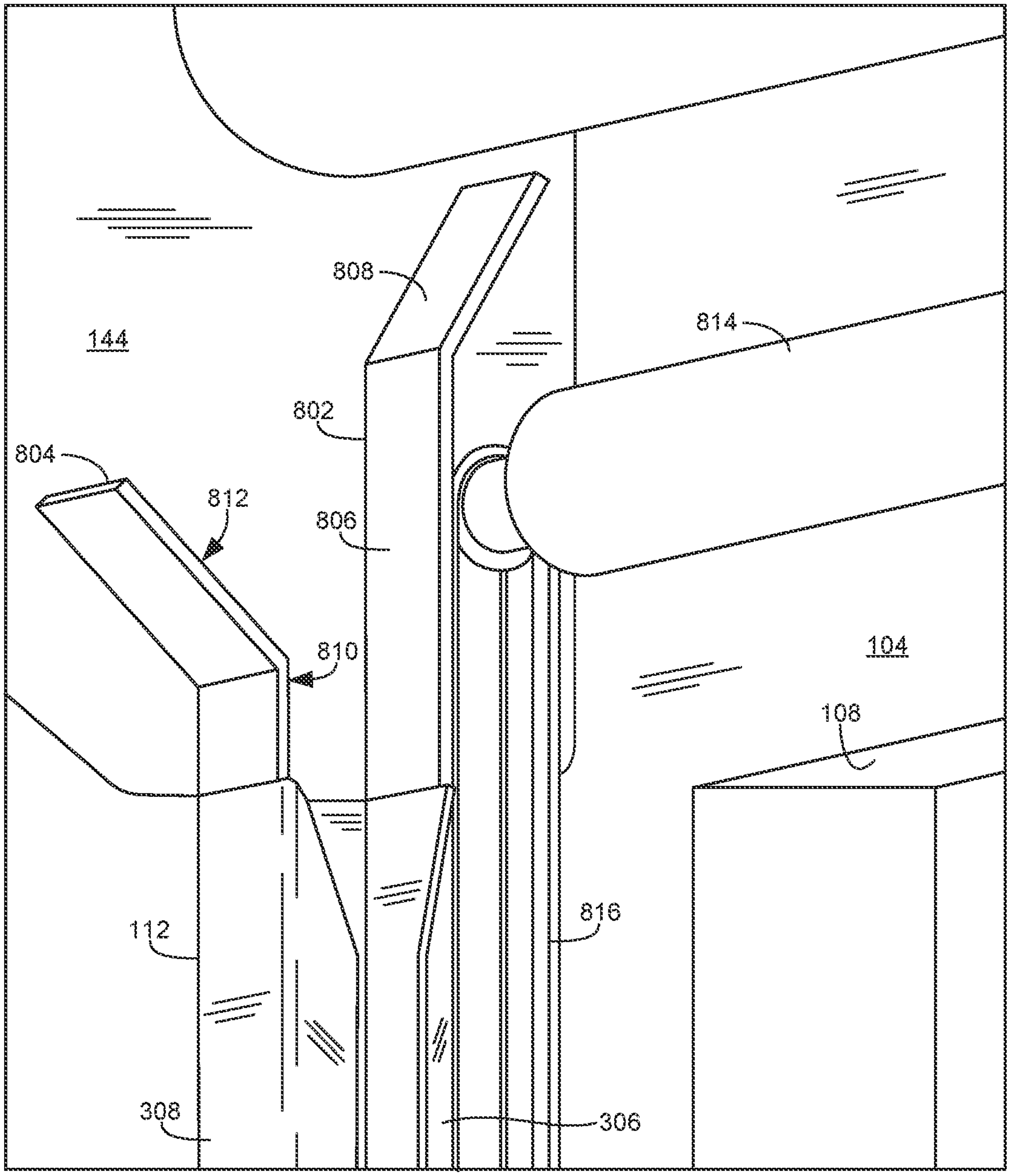
FIG. 8 is a view similar to FIG. 6 but showing another example refeed assembly.

FIG. 8 illustrates another example refeed assembly. In this example, first and second refeed blocks 802, 804 are formed from flat bar(s) (e.g., with a similar thickness to the track walls 306, 308) of material (e.g., metal, fiberglass, plastic, etc.) and mounted to the track 112 and/or side plate 144 using any suitable means (e.g., via welding, adhesive, fasteners, friction fit, etc.). The example refeed blocks 802, 804 can be implemented in the door system 100 that includes the door panel 110 having the tabs 128, 130, described above in connection with FIGS. 1-5. Further, the refeed blocks 802, 804 can be implemented in door systems with panels that do not include the tabs 128, 130. Further, the tabs 128, 130 can be implemented on door panels of door systems that do not include the refeed blocks 802, 804. As shown in the illustrated example, the first refeed block 802 of FIG. 8 has a similar inner profile to the first refeed block 140 of FIGS. 6 and 7 with a first channel surface 806 and a first slanted surface 808 that extends upwards and away from the first channel surface 806. Likewise, the second refeed block 804 of FIG. 8 has a similar inner profile to the second refeed block 142 of FIGS. 6 and 7 with a first channel surface 810 and a second slanted surface 812 that extends upwards and away from the second channel surface 810. Forming the refeed blocks 802, 804 using relative thin flat bar provides for a more compact construction. More particularly, forming the first refeed block 802 using a flat bar enables the track 112 to remain relatively close to the building wall 104 while still providing space for a wind bar 814 to be stowed above the upper edge 108 of the wall when not in use and moved into position (along a separate track 816) when needed. In some examples, the first and/or second refeed blocks 802, 804 can be integral extensions of the track walls 306, 308 or portions thereof. Alternatively, one or both of the refeed blocks 802, 804 can be integral portions of the side plate 144 (e.g., cut and bent to form the desired profile).

Figure 9:
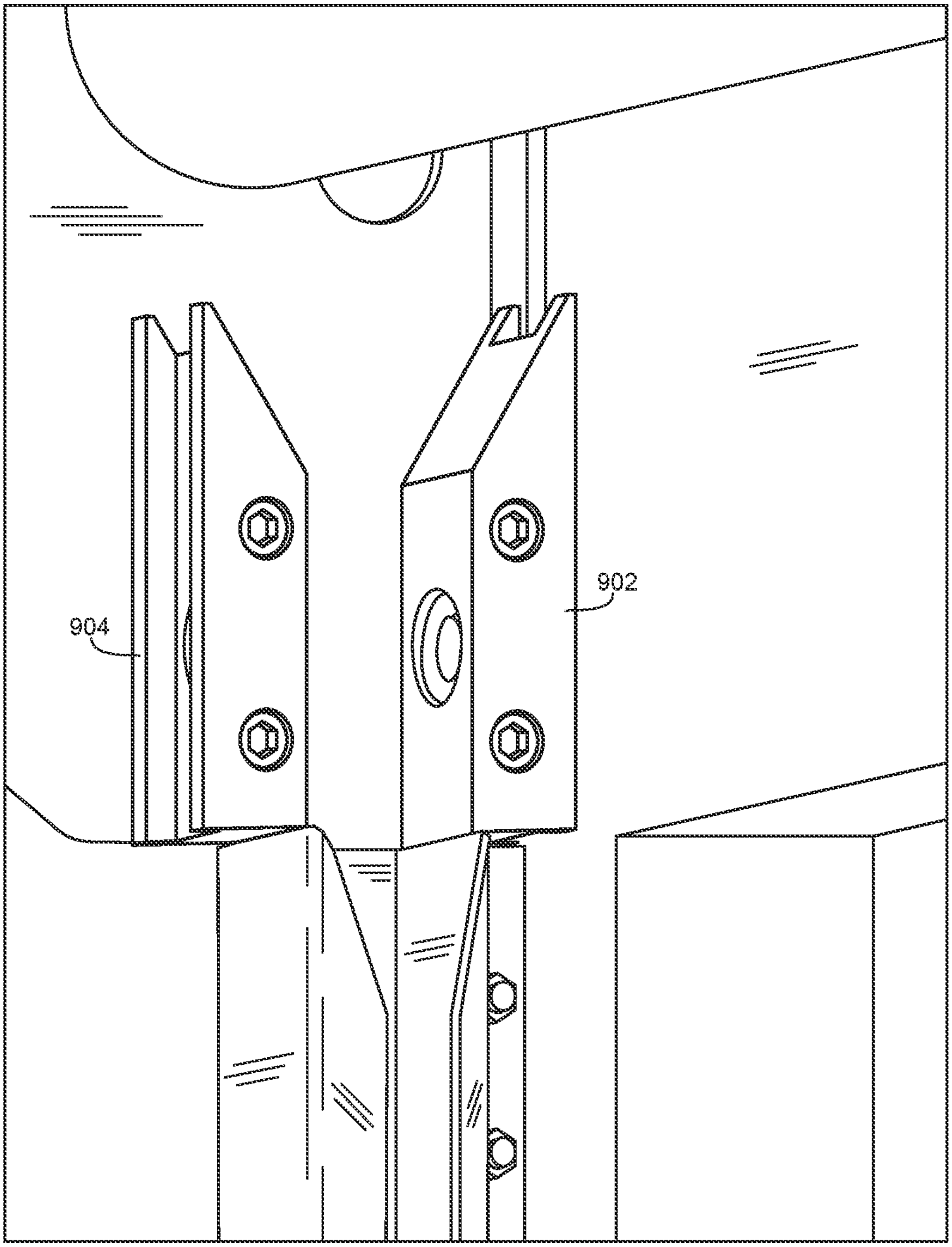
FIG. 9 is a view similar to FIG. 6 but showing another example refeed assembly.

FIG. 9 illustrates another example refeed assembly. In this example, first and second refeed blocks 902, 904 are substantially identical in shape, which can reduce manufacturing and replacements costs because either refeed block 902, 904 can be swapped out for the other. In other examples, the edges of the refeed blocks 902, 904 can be rounded or smoothed to reduce (e.g., prevent) damage to the panel 110. The example refeed blocks 902, 904 can be implemented in the door system 100 that includes the door panel 102 having the tabs 128, 130, described above in connection with FIGS. 1-5. Further, the refeed blocks 902, 904 can be implemented in door systems with panels that do not include the tabs 128, 130. Further, the tabs 128, 130 can be implemented on door panels of door systems that do not include the refeed blocks 902, 904.

Figure 10:
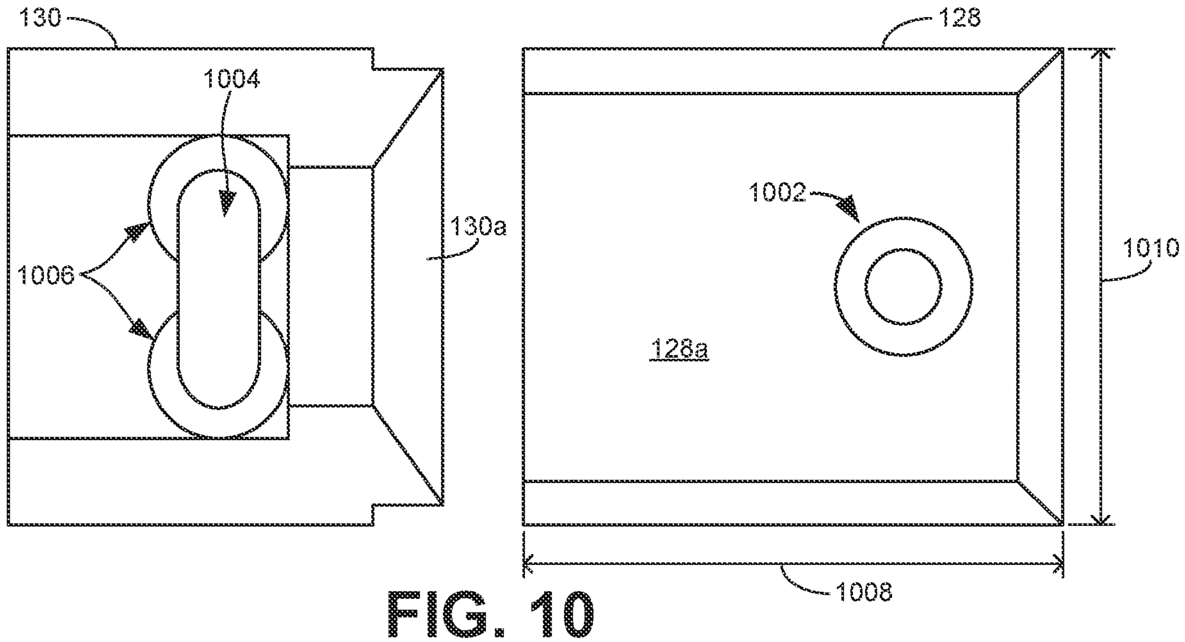
FIGS. 10-14 illustrate example implementations of the example wear resistant tab and the example lateral retention tab of FIG. 1
Figure 11:
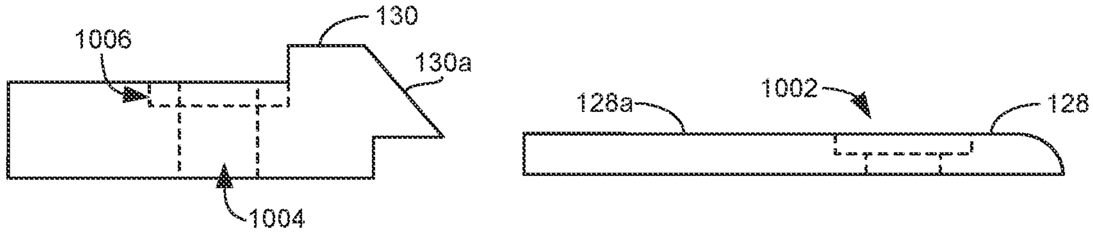
Figure 12:
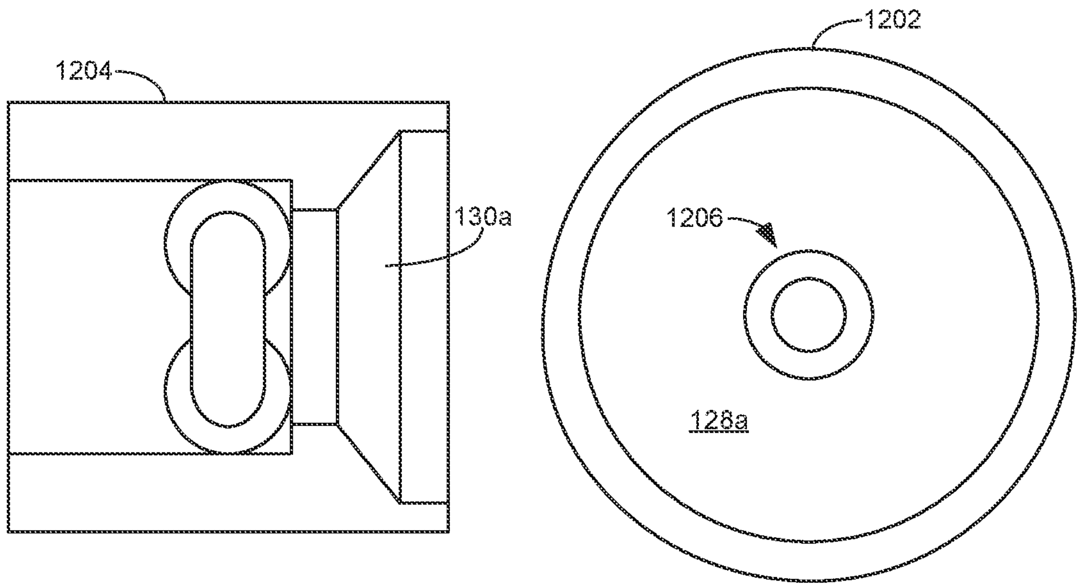
Figure 13:
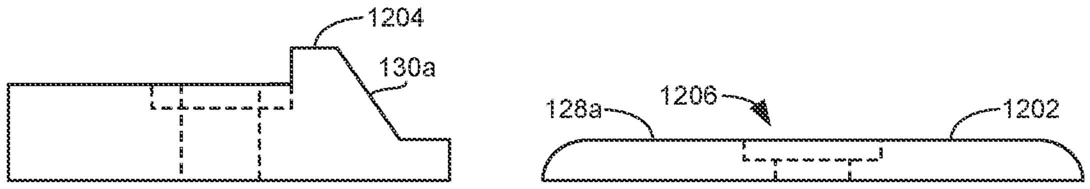
Figure 14:
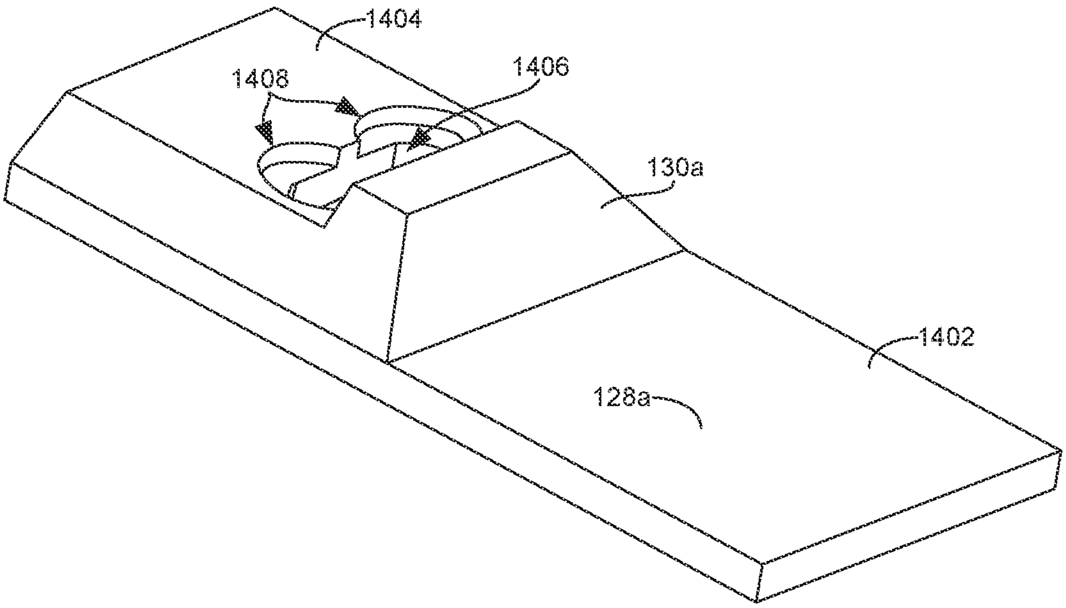

FIGS. 10-14 show detailed views of example guide members 126 (e.g., the wear resistant tabs and the lateral retention tabs). Specifically, FIGS. 10 and 11 are front and side views of the example wear resistant tab 128 and the example lateral retention tabs 130 shown in FIG. 3. FIGS. 12 and 13 are front and side views of another example wear resistant tab 1202 and another example lateral retention tab 1204. FIG. 14 is a perspective view of another example wear resistant tab 1402 and another example lateral retention tab 1404.

In some examples, the shape of the tabs 128, 130, as shown in FIGS. 10 and 11 enables the wear resistant tab 128 to partially extend underneath a portion of the lateral retention tab 130 when mounted to the panel 110 (as shown in FIG. 3). That is, in some examples, once mounted to the panel 110, at least a portion of the wear resistant tab 130 is between the panel 110 and a portion of the lateral retention tab 130. However, in the illustrated example of FIGS. 10 and 11, the lateral retention tab 130 includes a separate portion that is full depth to directly contact the panel 110 when mounted thereon. Partially overlapping the tabs 128, 130 in this manner facilitates the tabs to be mounted and secured in place as a unit. More particularly, the overhanging portion of the lateral retention tab 130 secures one end of the wear resistant tab 128 (closest to the lateral retention tab 130) so that a mounting hole 1002 within the wear resistant tab 128 can be located close to an opposite end of the wear resistant tab 128 (farthest away from the lateral retention tab 130). Positioning the mounting hole 1002 off-centered in this manner can keep the hole 1002 and the associated fastener clear of the track walls 306, 308 when moving relative to the track 112 as shown in FIG. 3.

In the illustrated example of FIGS. 10 and 11, the lateral retention tab 130 includes a slot 1004 that extends between two counterbored holes 1006 to provide space for two separate fasteners to extend therethrough. In other examples, the slot 1004 may be replaced with two independent mounting holes associated with each countersunk bore hole 1006. Spacing the hole 1002 and slot 1004 (and associated fasteners) farther apart can reduce the likelihood of damage to the panel 110 from impact or load with a directional component perpendicular to the vertical axis 132 of the panel 110.

Unlike the tabs 128, 130 shown in FIGS. 3, 10, and 11, the wear resistant tab 1202 and the lateral retention tab 1204 of FIGS. 12 and 13 are constructed to be mounted to the panel 110 independent of one another (e.g., neither tab 1202, 1204 overlaps the other when installed). This can facilitate the replacement of one of the tabs 1202, 1204 without having to remove the other. Although the example tabs 1202, 1204 of the illustrated example, are independently mounted, in some examples, they are nevertheless positioned adjacent one another. That is, although the tabs 1202, 1204 are shown as being spaced apart such that there is a gap between them, in some examples, the tabs 1202, 1204 are positioned so that the side of the wear resistant tab 1202 abuts against the side of the lateral retention tab 1204 once installed and in operation. As shown in the illustrated example of FIGS. 12 and 13, the tabs 1202, 1204 have similar mounting holes as those described above in connection with FIGS. 10 and 11, except that the mounting hole 1206 in the wear resistant tab 1202 is centered in the tab to provide stability inasmuch as the wear resistant tab 1202 is not separately braced by the lateral retention tab 1204.

In the illustrated example of FIG. 14, the wear resistant tab 1402 is constructed to sit between the panel 110 and the lateral retention tab 1404 when installed and in operation. That is, unlike in FIGS. 3, 10, and 11, where the example tabs 128, 130 only partially overlap but separately contact the panel 110, only the wear resistant tab 1402 in the illustrated example of FIG. 14 directly contacts the panel 110 when installed because the lateral retention tab 1404 is mounted on the wear resistant tab 1402. Overlapping the tabs 1402, 1404 enables the mounting process to be simplified using few fasteners because such fasteners can extend through both tabs 1402, 1404. More particularly, as shown in the illustrated example, the lateral retention tab 130 includes a slot 1406 (similar to the slot 1004 of FIGS. 10 and 11) that extends between two counterbored holes 1408 to provide space for two separate fasteners to extend therethrough. As noted above, in other examples, the slot 1406 may be replaced with two independent mounting holes associated with each countersunk bore hole 1408. Alternatively, a single hole with a single fastener could be used.

In some examples, the wear retention tabs 128, 1202, 1402 have a width measured in the horizontal direction (e.g., the width 1008 shown in FIG. 10) and a height measured in the vertical direction (e.g., the height 1010 shown in FIG. 10) that are equal or approximately equal to one another (as in FIG. 12) or relatively similar in dimension (as in FIG. 10). That is, in some examples, the width is shorter than the height but at least 50% of the height of the tab. The width may alternatively be any other suitable proportion of the height (e.g., at least 60%, 70%, 75%, 80%, 85%, 90%, 95%, etc.). In other examples, the height is shorter than the width but at least 50% of the width of the tab. The width may alternatively be any other suitable proportion of the height (e.g., at least 60%, 70%, 75%, 80%, 85%, 90%, 95%, etc.). In some examples, the above proportions or relative dimensions between the width and height of the tabs 128, 1202, 1402 alternatively apply to the exposed portion of the contact surface **128*a* when the tabs 128, 1202, 1402 are mounted to the panel 110. That is, the width of the tab 1402 shown in FIG. 14 is significantly greater than (e.g., more than twice) the height of the tab. However, the width of the exposed contact surface 128*a* of the tab 1402 is relatively similar to (e.g., less than twice) the height of the tab 1402. Providing tabs with heights and widths that are relatively similar (e.g., the longer dimension is less than twice the other) produces a relatively large surface area to interface with the tracks 306, 308. The particular dimensions of the heights and widths of the tabs 128, 1202, 1402 (as also the lateral retention tabs 130, 1204, 1404) can be any suitable dimensions. For instance, in some examples, the height of the tabs 128, 130, 1202, 1204, 1402, 1404** is approximately 1.5 inches. However, in other examples, the height can be any other suitable dimension (e.g., 1 inch, 1.25 inches, 1.75 inches, 2 inches, between 1 and 2 inches, greater than 2 inches, etc.).

While example tabs 128, 130, 1202, 1204, 1402, 1404 have been shown and described in connection with FIGS. 10-14, other tabs having different shapes and/or sizes may also be constructed in which the lateral retention and wear resistant tabs are to be independently mounted side by side (e.g., as in FIGS. 12 and 13), are to be mounted with one on top of the other (e.g., as in FIG. 14), or are to be partially overlapping (e.g., as in FIGS. 10 and 11). In some examples, any one of the tabs 128, 130, 1202, 1204, 1402, 1404 shown and described in FIGS. 10-14 are used on a door panel that passes through any one of the refeed blocks 140, 142, 802, 804, 902, 904 of FIGS. 6-9. In some examples, any one of the tabs 128, 130, 1202, 1204, 1402, 1404 are used on a door panel that is associated with a door system that does not include any of the refeed blocks 140, 142, 802, 804, 902, 904. Further, in some examples, different ones of the tabs 128, 130, 1202, 1204, 1402, 1404 are used in combination and positioned at different locations along the lateral edges of the door panel 110 of FIG. 1-5.

Figure 2:
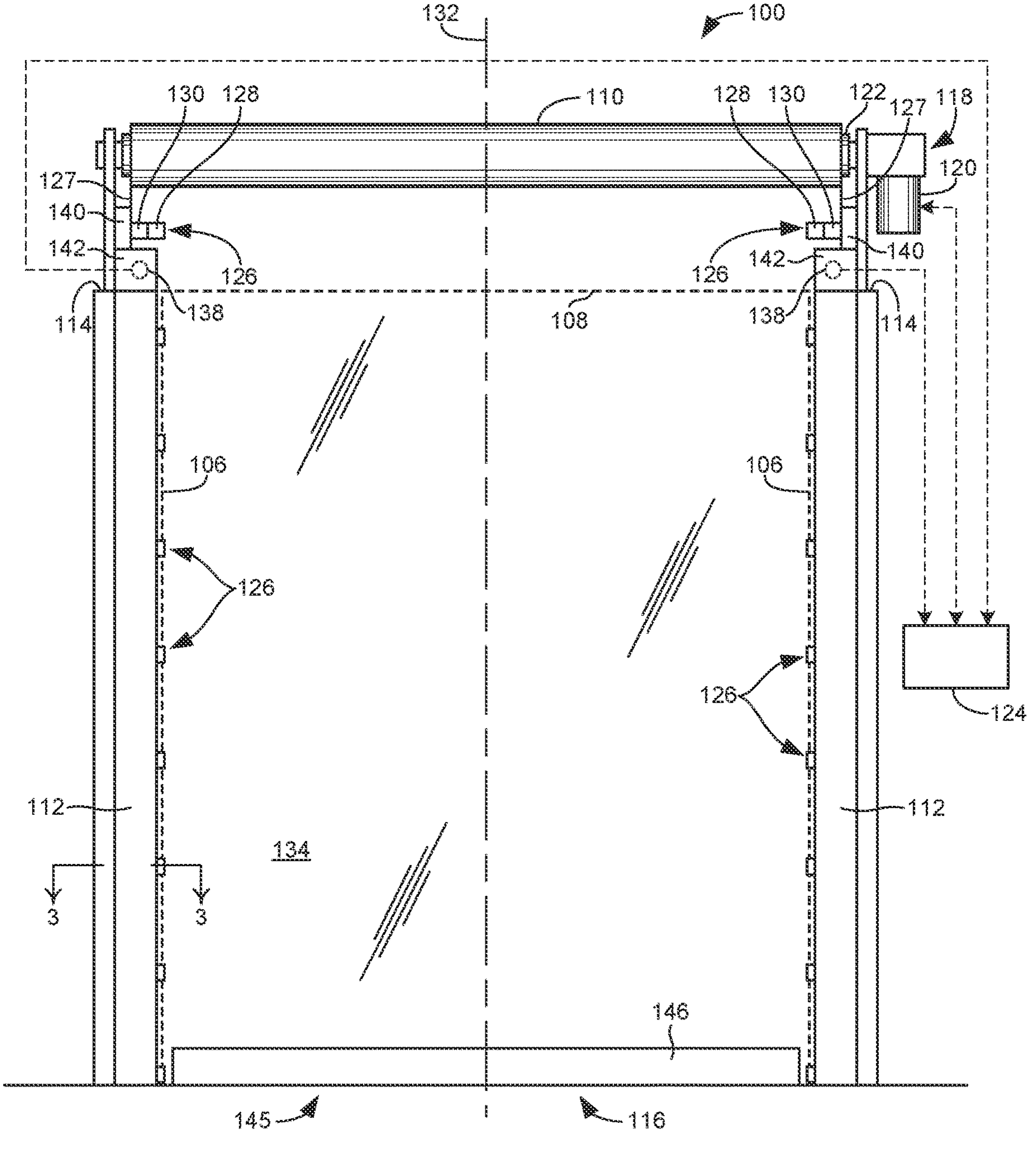
FIG. 2 illustrates the example door system of FIG. 1 but showing the example door panel in a closed position.
Figure 15:
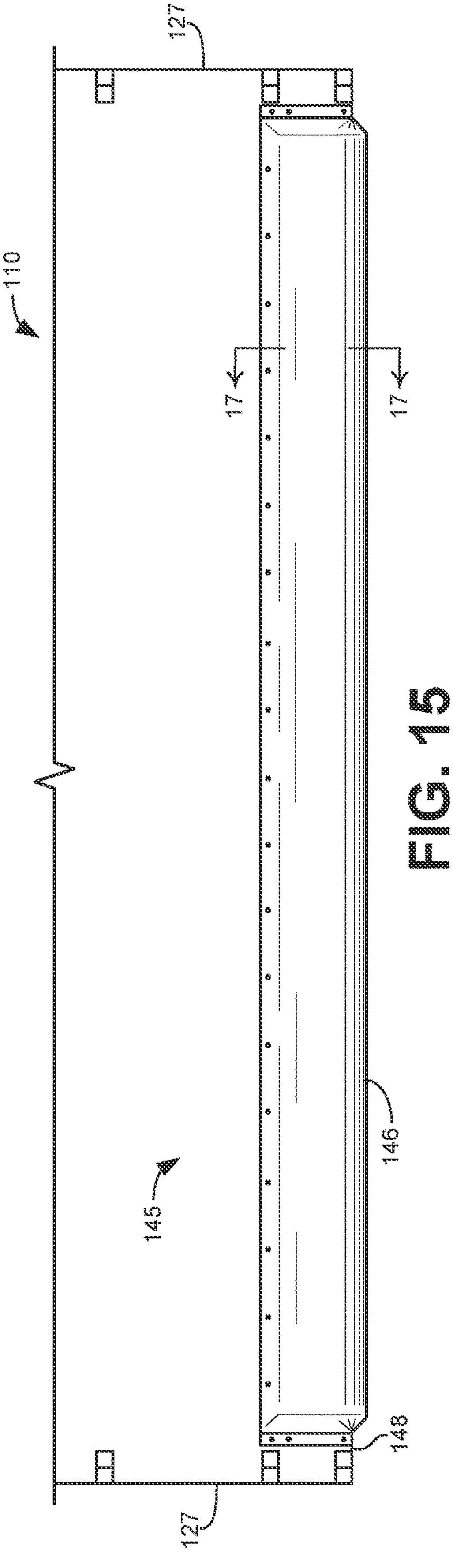
FIG. 15 is a detailed view of a bottom portion of the door panel of FIGS. 1-5.

As shown in the illustrated example of FIGS. 1 and 2, the leading edge 116 of the panel 110 includes a bottom seal assembly 145 that includes a main loop seal 146 that wraps under a bottom edge 148 of the main body 134 of the panel 110. As shown in FIG. 1, in some examples, the main loop seal 146 includes some slack to hang or droop below the bottom edge 148 of the main body 134 of the panel 110 to facilitate sealing engagement with the floor when the door panel 110 is in the closed position. A more detailed view of the bottom seal assembly 145 at the bottom of the panel 110 with the main loop seal 146 attached is shown in the illustrated example of FIG. 15. In FIG. 15, the tracks 112 have been omitted for the sake of clarity.

Figure 16:
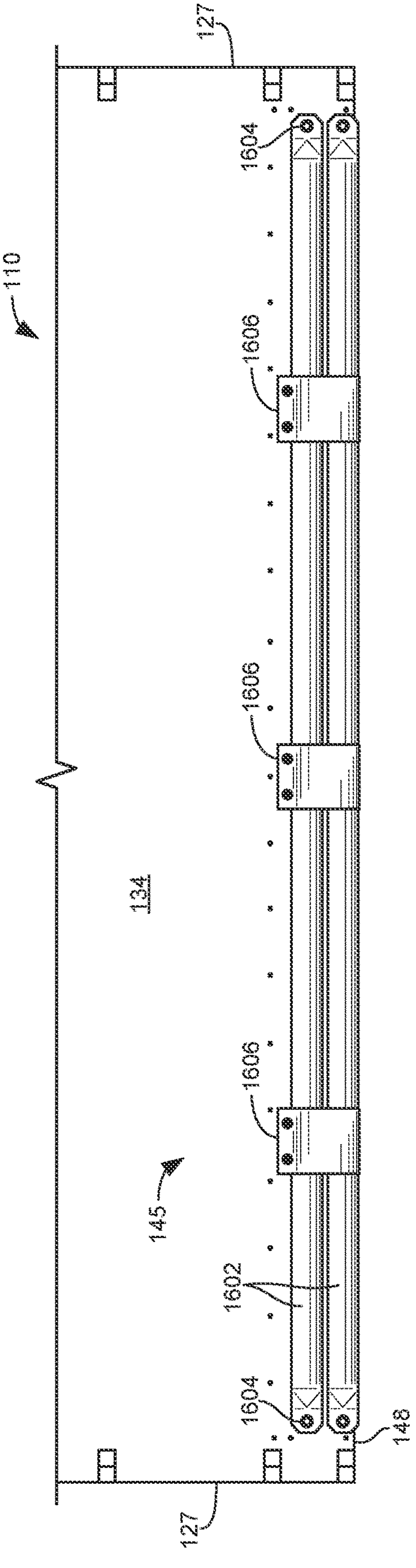
FIG. 16 is a view similar to FIG. 15 but with the main loop seal removed.
Figure 17:
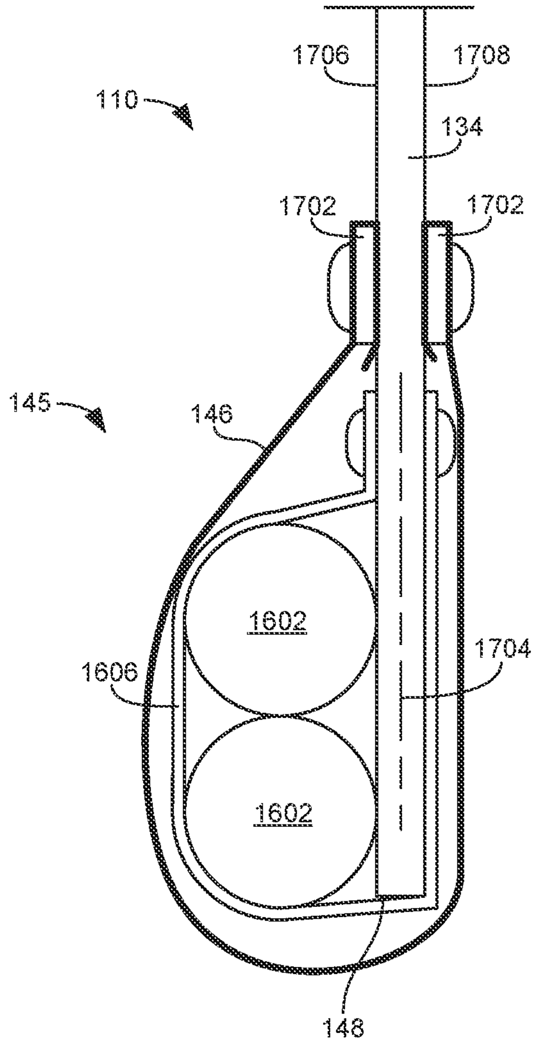
FIG. 17 is a cross-sectional view of the bottom portion of the door panel taken along line 17-17 of FIG. 15.

FIG. 16 shows the bottom seal assembly 145 of the panel 110 represented in FIG. 15 except that the main loop seal 146 has been removed. FIG. 17 illustrates a cross-sectional view of the bottom seal assembly 145 of the panel 110 taken along the line 17-17 of FIG. 15. As shown in the illustrated example, one or more weighted tubes or hoses 1602 are disposed inside and enclosed by the main loop seal 146. In this example, the weighted tubes 1602 are flexible and filled with a granulated material (e.g., garnet sand). The granulated material provides weight to the panel 110 to facilitate the movement of the panel 110 to the closed position. Further, the flexible nature of the tubes 1602 with the granulated fill material enables the tubes 1602 to reduce (e.g., avoid) permanent damage to components when subject to an impact. Further, the flexible nature of the bottom edge 148, in contrast to a more rigid material, both enables the breakaway functionality of the bottom edge 148 of the panel 110 and reduces damage to the cause (e.g., personnel, equipment, product, etc.) of impact to or interruption of the path of the closing panel 110. In the illustrated example of FIG. 16, both ends of the tubes 1602 are closed off and attached to the main body 134 of the panel 110 via one or more grommets 1604. In some examples, to support the midsection of the tubes 1602, one or more straps 1606 are wrapped around the tubes 1602 and attached to the main body 134 of the panel 110 using any suitable means (e.g., sewing, threaded fasteners, adhesives, etc.). In other examples, the straps 1606 are omitted. In such examples, the tubes 1602 may include a free edge extending along at least a portion of the length of the tube 1602 which can be attached to the main body 134 of the panel 110 or to an adjacent tube 1602.

In some examples, as illustrated in FIG. 17, the upper edges of the main loop seal 146 are wrapped around a stiffener 1702 that extends along at least a portion of the length of the seal 146. In some examples, the stiffener 1702 is made of a material (e.g., fiberglass, plastic) that is stiffer than the fabric used to make the main loop seal 146. The stiffener 1702 facilitates the attachment of the main loop seal 146 to the main body 134 of the panel 110 using any suitable fastener (e.g., screws, bolts, rivets, etc.).

As mentioned above, and shown most clearly in FIG. 17, the main loop seal 146 extends below the bottom edge 148 of the main body 134 of the panel 110 to facilitate sealing engagement with the floor. In some examples, the bottom-most tube 1602 is also positioned to extend below the bottom edge of the main body 134 of the panel 110 to facilitate sealing engagement with the floor.

Figure 18:
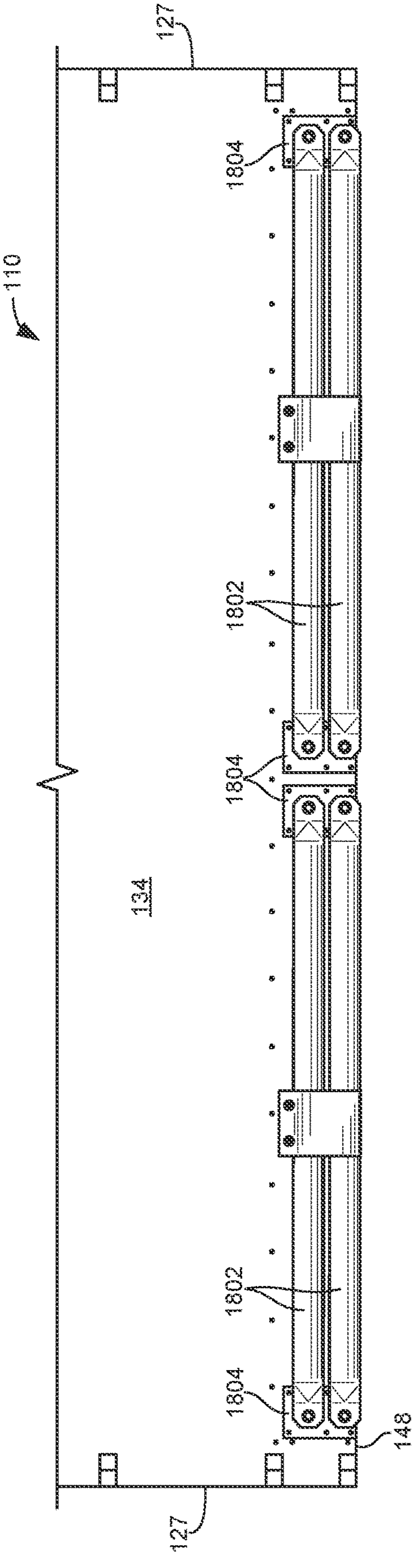
FIG. 18 is a view similar to FIG. 16 but showing a different example arrangement of example weighted tubes.

Although FIGS. 16 and 17 show two weighted tubes 1602 carried by the panel 110, in other examples, only one tube 1602 is used. In other examples, more than two weighted tubes are used. In some examples, rather than the tubes 1602 extending substantially the full width of the panel 110 (as shown in FIG. 16), multiple shorter tubes 1802 are distributed horizontally along the width of the panel as shown in the illustrated example of FIG. 18. Further, in some examples, the panel 110 includes stiffener plates 1804 at the points of attachment of the weighted tubes 1802 (and/or the tubes 1602 of FIG. 16). In some examples, the stiffener plates 1804 are only used at the lateral edges 127 of the panel 110 to provide more stability at the bottom corners of the panel 110. In the illustrated example, the stiffener plates 1804 adjacent the lateral edges 127 of the panel 110 are positioned to remain outside of the tracks 112 during normal operation. However, in other examples, the stiffener plates 1804 extend into the tracks 112. In some such examples, the stiffener plates 1804 serve the purpose of and replace the wear resistant tabs 128 at the bottom corners of the panel 110.

Figure 19:
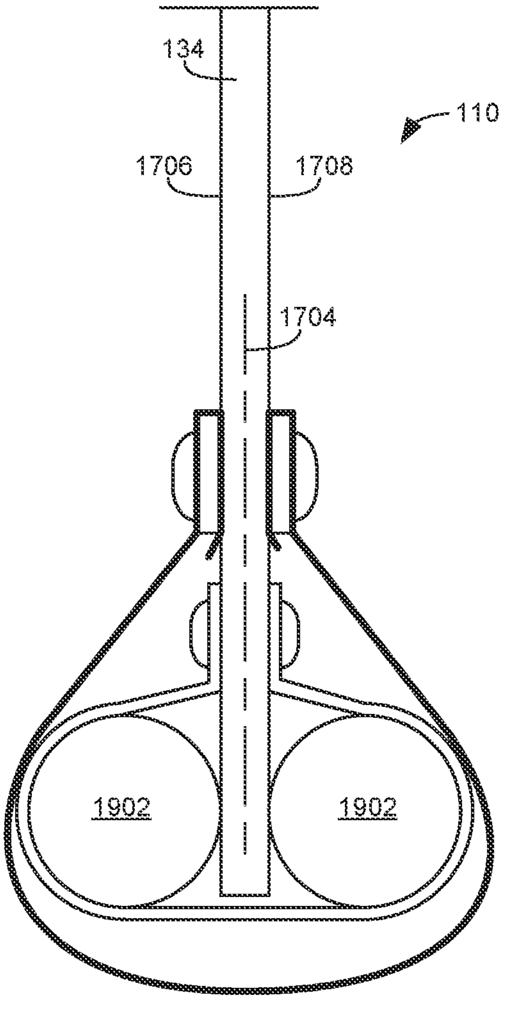
FIG. 19 is a view similar to FIG. 17 but showing another different example arrangement of example weighted tubes.

FIG. 19 illustrates another arrangement of weighted tubes 1902 in which the tubes 1902 are positioned on both sides of the panel 110 to center the weight of the tubes in line with the main body 134 of the panel 110. As shown most clearly in FIGS. 17 and 19, the weighted tubes 1602, 1802, 1902 are mounted to the panel 110 offset relative to a central plane 1704 of the panel 110. More particular, in some examples, ones of the weighted tubes 1602, 1802, 1902 are mounted adjacent (e.g., abutting) either a first (e.g., front) side 1706 or a second (e.g., back) side 1708 of the panel 110. In some examples, the tubes 1602, 1802, 1902 are mounted on only one side 1706, 1708 of the panel (as shown in FIG. 17). In other examples, separate tubes 1602, 1802, 1902 are mounted on both sides 1706, 1708 of the panel (e.g., as shown in FIG. 19). In some such examples, the number of tubes 1602, 1802, 1902 on each side 1706, 1708 of the panel 110 is the same (as in FIG. 19), while in other examples the number of tubes on each side 1706, 1708 is different (e.g., two on the first side 1706 and three on the second side 1708). Furthermore, the number of tubes 1602, 1802, 1902 may be different than as shown in the illustrated examples. For instance, while FIG. 17 shows two tubes 1602 on the first side 1706, in other examples, there is only one tube 1602. In other examples, there is more than two tubes arranged vertically along the first side 1706 of the panel 110. In still other examples, the bottom seal assembly 145 is reversed so that no tubes are on the first side 1706 and one or more tubes 1602 are positioned on the second side 1708. Similarly, while FIG. 19 shows one tube 1902 on each side 1706, 1708, in other examples, one or both of the sides 1706, 1708 of the panel 110 includes two or more tubes arranged vertically along the panel 110. While the bottom seal assembly 145 of FIGS. 16-19 show tubes 1602, 1802, 1902 fastened to the main body 134 of the panel 110 at a different location than that where the main loop seal 146 is fastened to the main body 134 of the panel 110, alternatively, they could be fastened at the same location with the same fasteners, with or without stiffener plates.

Although different arrangements are shown between FIGS. 15-17, FIG. 18, and FIG. 19, any of the arrangements disclosed herein can be implemented as the bottom seal assembly 145 of FIG. 1 for the panel 110 that includes any of the tabs 128, 130, 1202, 1204, 1402, 1404 in association with a door system that includes any one of the refeed blocks 140, 142, 802, 804, 902, 904 of FIGS. 6-9. Further, in some examples, any one of the arrangements for the bottom seal assembly 145 shown and described in connection with FIGS. 15-19 can be implemented on door panels that do not include the tabs 128, 130, 1202, 1204, 1402, 1404 and/or in door systems that do not include the refeed blocks 140, 142, 802, 804, 902, 904.

As shown in the illustrated example of FIGS. 1, 2, and 15, the main loop seal 146 extends substantially the full width of the panel 110 between the tracks 112. However, in this example, the ends of the main loop seal 146 remain spaced apart from the tracks 112 to avoid causing friction and wear between the tracks 112 and the main loop seal 146. In other examples, the main loop seal 146 extends into the tracks 112 along with the main body 134 of the door panel 110 when in the closed position. In examples where the main loop seal 146 remains spaced apart from and outside the tracks 112, there may not be an adequate seal against the floor at the bottom corners of the doorway (e.g., where the main body 134 of the panel 110 extends beyond the main loop seal 146 and into the tracks 112). Accordingly, in some examples, the bottom seal assembly 145 includes a secondary loop seal 2002 attached to the main body 134 of the door panel 110 to fill in this gap. The secondary loop seal is omitted from FIGS. 1, 2, and 15 for purposes of explanation but is shown in the enlarged view of FIG. 20.

Figure 20:
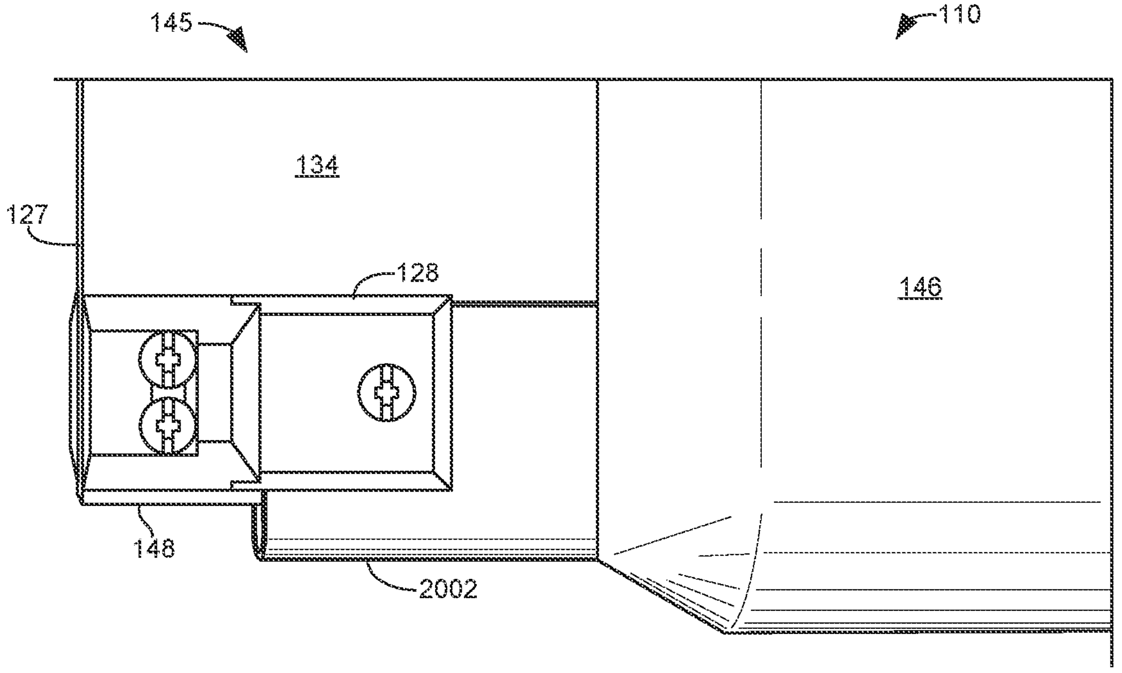
FIG. 20 is an enlarged view of the bottom portion of the door panel of FIGS. 1-5.

As shown in the illustrated example of FIG. 20, the secondary loop seal 2002 extends below the bottom edge 148 of the main body 134 of the panel 110 so that the secondary loop seal 2002 will sealingly engage with the floor, when the panel 110 moves to the closed position, in a similar manner to that of the main loop seal 146 as described above. In the illustrated examples, the secondary loop seal 2002 is smaller than the main loop seal 146 because it is sealing a smaller space and is at least partially confined between the track walls 306, 308 of the tracks 112. In this example, the secondary loop seal is at least partially held against the main body 134 of the panel 110 by the wear resistant tab 128 (and a corresponding tab on the opposite side of the panel). In this way, the wear resistant tab 128 will protect the secondary loop seal 2002 from wear caused by friction as the panel 110 moves between the open and closed positions.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., “a”, “an”, “first”, “second”, etc.) do not exclude a plurality. The term “a” or “an” object, as used herein, refers to one or more of that object. The terms “a” (or “an”), “one or more”, and “at least one” are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Further examples and combinations thereof include the following:

Example 1 includes a door system comprising a panel, a track including a first track wall and a second track wall opposite the first track wall, the first and second track walls defining a channel therebetween, a lateral edge of the panel to move along the channel as the panel moves between a closed position and an open position, a first refeed block to be aligned with the first track wall, the first refeed block to extend a first distance above the first track wall, and a second refeed block to be aligned with the second track wall, the second refeed block to extend a second distance above the second track wall, the first distance greater than the second distance.

Example 2 includes the door system of example 1, wherein the first refeed block includes a first channel surface and the second refeed block includes a second channel surface, the first channel surface to be substantially flush with an inner surface of the first track wall, the second channel surface to be substantially flush with an inner surface of the second track wall.

Example 3 includes the door system of example 2, wherein the first refeed block includes a first slanted surface that slants away from the first channel surface and the second refeed block includes a second slanted surface that slants away from the second channel surface.

Example 4 includes the door system of example 3, wherein the first slanted surface extends away from the first channel surface by a third distance and the second slanted surface extends away from the second channel surface by a fourth distance, the fourth distance greater than the third distance.

Example 5 includes the door system of any one of examples 2-4, wherein the first refeed block includes a recessed surface that is inset relative to the first channel surface, a distance between the recessed surface and the first channel surface corresponding to a thickness of the first track wall.

Example 6 includes the door system of any one of examples 1-5, wherein the first refeed block is to house a photo-eye sensor to emit a beam of light toward the second refeed block.

Example 7 includes the door system of example 6, wherein the first refeed block includes a groove extending along a rear surface facing away from the second refeed block, the groove dimensioned to provide space for wiring for the photo-eye sensor.

Example 8 includes the door system of any one of examples 1-7, wherein the second refeed block includes a bottom edge that is to protrude outward from an outer surface of the second track wall, the bottom edge of the second refeed block being rounded.

Example 9 includes the door system of any one of examples 1-8, further including a side plate, the first and second refeed blocks to be mounted to the side plate via fasteners.

Example 10 includes the door system of example 9, wherein the first and second refeed blocks including at least one of countersunk holes or counterbored holes for the fasteners so that the fasteners do not protrude from an outer surface of the first and second refeed blocks.

Example 11 includes the door system of any one of examples 1-10, wherein the first and second refeed blocks are made from flat bars of metal welded to a side plate.

Example 12 includes a door system comprising a panel, a track to guide movement of the panel between a closed position and an open position, a first refeed block to extend upward from an upper end of the track by a first distance, and a second refeed block to extend upward from the upper end of the track by a second distance different than the first distance, the first and second refeed blocks to face one another on opposite sides of the track such that the panel is to extend between the first and second refeed blocks when in the closed position.

Example 13 includes the door system of example 12, wherein the track includes a first wall and a second wall, the first wall having a first main portion and a first end portion angled relative to the first main portion, the second wall having a second main portion and a second end portion angled relative to the second main portion, a first distance between the first and second refeed blocks corresponding to a second distance between the first and second main portions of the first and second walls, the first and second end portions angled toward one to define a third distance therebetween corresponding to an opening in the track through which the panel extends when in the closed position, the third distance less than the first and second distances.

Example 14 includes the door system of example 13, wherein upper ends of the first and second end portions are tapered relative to upper ends of the first and second main portions to define a V-shaped entry into the opening.

Example 15 includes the door system of any one of examples 12-14, wherein the first and second refeed blocks include upper surfaces that angle away from one another.

Example 16 includes the door system of any one of examples 12-15, wherein the track defines a channel, a lateral edge of the panel to move along the channel as the panel moves between the closed position and the open position, the door system further including a wear resistant tab to be mounted on the panel to align with an opening in the track, and a lateral retention tab to be mounted on the panel to be entirely inside the channel when the panel is in the closed position, the lateral retention tab being distinct from the wear resistant tab.

Example 17 includes the door system of any one of examples 12-16, further including a bottom seal assembly, the bottom seal assembly including a weighted tube to be carried by the panel, and a loop seal to surround the weighted tube and a bottom edge of the panel.

Example 18 includes a door system comprising a panel, a track defining a channel, a lateral edge of the panel to move along the channel as the panel moves between a closed position and an open position, a wear resistant tab to be mounted on the panel to align with an opening in the track, and a lateral retention tab to be mounted on the panel to be entirely inside the channel when the panel is in the closed position, the lateral retention tab being distinct from the wear resistant tab.

Example 19 includes the door system of example 18, wherein the wear resistant tab is made of a first material and the lateral retention tab is made of a second material different than the first material.

Example 20 includes the door system of example 19, wherein the first material has a lower coefficient of friction than the second material.

Example 21 includes the door system of any one of examples 19 or 20, wherein the second material is stronger than the first material.

Example 22 includes the door system of any one of examples 19-21, wherein the first material is ultra-high molecular weight (UHMW) plastic.

Example 23 includes the door system of any one of examples 19-22, wherein the second material is nylon.

Example 24 includes the door system of any one of examples 18-23, wherein the wear resistant tab is a first wear resistant tab, and the lateral retention tab is a first lateral retention tab, the door system further including a second wear resistant tab and a second lateral retention tab, the first and second wear resistant tabs mounted at corresponding locations on opposites sides of the panel, the first and second lateral retention tabs mounted at corresponding locations on the opposites sides of the panel.

Example 25 includes the door system of example 24, wherein the first lateral retention tab has a first surface farthest away from the panel when mounted to the panel and the second lateral retention tab has a second surface farthest away from the panel when mounted to the panel, a distance between the first surface and the second surface greater than a width of the opening in the track.

Example 26 includes the door system of any one of examples 24 or 25, wherein the first wear resistant tab has a first surface farthest away from the panel when mounted to the panel and the second wear resistant tab has a second surface farthest away from the panel when mounted to the panel, a distance between the first surface and the second surface less than a width of the opening in the track.

Example 27 includes the door system of any one of examples 18-26, wherein a first portion of the wear resistant tab is to be within the channel when the panel is in the closed position and second portion of the wear resistant tab is to be outside the channel when the panel is in the closed position.

Example 28 includes the door system of any one of examples 18-27, wherein a portion of the wear resistant tab is to be between the panel and a first portion of the lateral retention tab.

Example 29 includes the door system of example 28, wherein a second portion of the lateral retention tab is to be in direct contact with the panel.

Example 30 includes the door system of any one of examples 18-29, wherein the wear resistant tab separates the lateral retention tab from the panel.

Example 31 includes the door system of any one of examples 18-30, wherein in the wear resistant tab is mounted to the panel adjacent the lateral retention tab without either of the wear resistant tab or the lateral retention tab overlapping the other.

Example 32 includes the door system of any one of examples 18-31, wherein the wear resistant tab is to be closer to a central vertical axis of the panel than the lateral retention tab.

Example 33 includes a door system comprising a panel having a lateral edge, the lateral edge to move along a channel of a track, the track to guide movement of the panel, a lateral retention tab to be mounted on the panel adjacent the lateral edge, the lateral retention tab to help retain the lateral edge of the panel within the track, and a wear resistant tab to be mounted on the panel adjacent the lateral retention tab, the lateral retention tab closer to the lateral edge than the wear resistant tab is to the lateral edge, the wear resistant tab distinct from the lateral retention tab.

Example 34 includes the door system of example 33, wherein the wear resistant tab is to be positioned between the panel and the track at an opening of the track through which both the panel and the wear resistant tab extend.

Example 35 includes the door system of any one of examples 33 or 34, wherein the wear resistant tab is a first wear resistant tab of a plurality of wear resistant tabs distributed along a length of the panel, adjacent ones of the plurality of wear resistant tabs being spaced apart to define exposed portions of the panel between the adjacent ones of the plurality of wear resistant tabs, a thickness of the adjacent ones of the plurality of wear resistant tabs to maintain the exposed portions of the panel spaced apart from the track.

Example 36 includes the door system of any one of examples 33-35, wherein the wear resistant tab includes an exposed contact surface that is to engage with the track as the panel moves along the channel, the contact surface having a width and a height, the width being less than twice the height, the height being less than twice the width.

Example 37 includes the door system of any one of examples 33-36, further including the track, the track including a first track wall and a second track wall opposite the first track wall, the first and second track walls defining the channel therebetween, a first refeed block to be aligned with the first track wall, the first refeed block to extend a first distance above the first track wall, and a second refeed block to be aligned with the second track wall, the second refeed block to extend a second distance above the second track wall, the first distance greater than the second distance.

Example 38 includes the door system of any one of examples 33-37, further including a bottom seal assembly, the bottom seal assembly including a weighted tube to be carried by the panel, and a loop seal to surround the weighted tube and a bottom edge of the panel.

Example 39 includes a door system comprising a panel, a track defining a channel, a lateral edge of the panel to move along the channel as the panel moves between a closed position and an open position, and a bottom seal assembly including a weighted tube to be carried by the panel, and a loop seal to surround the weighted tube and a bottom edge of the panel.

Example 40 includes the door system of example 39, wherein the loop seal is made of fabric, the loop seal to hang below the bottom edge of the panel.

Example 41 includes the door system of any one of examples 39 or 40, wherein the weighted tube is to extend below the bottom edge of the panel.

Example 42 includes the door system of any one of examples 39-41, wherein the weighted tube is made of a flexible material filled with a granulated material.

Example 43 includes the door system of any one of examples 39-42, wherein the weighted tube is to be mounted to the panel at both ends of the tube, the bottom seal assembly further including a strap to be attached to the panel, the strap to support a midsection of the weighted tube.

Example 44 includes the door system of any one of examples 39-43, wherein the bottom seal assembly further includes a stiffener extending along a length of the loop seal, the loop seal to wrap around the stiffener when attached to the panel.

Example 45 includes the door system of any one of examples 39-44, wherein the weighted tube is a first weighted tube, the bottom seal assembly further including a second weight tube.

Example 46 includes the door system of example 45, wherein the first weighted tube is closer to the bottom edge of the panel than the second weight tube.

Example 47 includes the door system of any one of examples 45 or 46, wherein the first weighted tube is to extend along a first portion of the bottom edge of the panel and the second weighted tube is to extend along a second portion of the bottom edge of the panel, the first portion being distinct from the second portion.

Example 48 includes the door system of any one of examples 45-47, wherein the first weighted tube is on a first side of the panel and the second weighted tube is on a second side of the panel opposite the first side.

Example 49 includes the door system of any one of examples 39-48, wherein the loop seal is a main loop seal, and lateral ends of the main loop seal are to be spaced apart from the track, the bottom seal assembly further including a secondary loop seal to extend from one of the ends of the main loop seal into the channel of the track.

Example 50 includes the door system of any one of examples 39-49, wherein the weighted tube is to be offset relative to a central plane of the panel when the panel is in the closed position.

Example 51 includes a door system comprising a track, a panel made of rubber to move along the track, a weighted tube to be coupled to the panel, and a loop seal to surround the weighted tube and a bottom edge of the panel, the panel to carry a weight of the tube independent of the loop seal.

Example 52 includes the door system of example 51, wherein the loop seal is to hang below the bottom edge of the panel.

Example 53 includes the door system of any one of examples 51 or 52, wherein the loop seal is to hang below a bottommost point of the weighted tube.

Example 54 includes the door system of example 53, wherein the bottommost point of the weight tube is to be below the bottom edge of the panel.

Example 55 includes the door system of any one of examples 51-54, further including the track, the track including a first track wall and a second track wall opposite the first track wall, the first and second track walls defining a channel therebetween, a first refeed block to be aligned with the first track wall, the first refeed block to extend a first distance above the first track wall, and a second refeed block to be aligned with the second track wall, the second refeed block to extend a second distance above the second track wall, the first distance greater than the second distance.

Example 56 includes the door system of any one of examples 51-55, wherein the track defines a channel, a lateral edge of the panel to move along the channel as the panel moves between a closed position and an open position, the door system further including a wear resistant tab to be mounted on the panel to align with an opening in the track, and a lateral retention tab to be mounted on the panel to be entirely inside the channel when the panel is in the closed position, the lateral retention tab being distinct from the wear resistant tab.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A door system comprising:

a panel;

a track including a first track wall and a second track wall opposite the first track wall, the first and second track walls defining a channel therebetween, a lateral edge of the panel to move along the channel as the panel moves between a closed position and an open position;

a first refeed block having a first planar surface and a second planar surface, the first planar surface to be aligned with and an extension of the first track wall, the second planar surface to slant away from the first planar surface, the first planar surface to extend a first vertical distance above the first track wall, the second planar surface to extend a first horizontal distance from the first planar surface; and a second refeed block having a third planar surface and a fourth planar surface, the third planar surface to be aligned with and an extension of the second track wall, the fourth planar surface to slant away from the third planar surface, the third planar surface to extend a second vertical distance above the second track wall, the fourth planar surface to extend a second horizontal distance from the third planar surface, the first vertical distance greater than a combined vertical height of both the third and fourth planar surfaces, the first horizontal distance less than the second horizontal distance.

2. The door system of claim 1, wherein the first planar surface is to be substantially flush with an inner surface of the first track wall, and the third planar surface is to be substantially flush with an inner surface of the second track wall.

3. The door system of claim 1, wherein the first refeed block includes a recessed surface that is inset relative to the first planar surface, a distance between the recessed surface and the first planar surface corresponding to a thickness of the first track wall.

4. The door system of claim 1, wherein the first refeed block is to house a photo-eye sensor to emit a beam of light toward the second refeed block.

5. The door system of claim 4, wherein the first refeed block includes a groove extending along a rear surface facing away from the second refeed block, the groove dimensioned to provide space for wiring for the photo-eye sensor.

6. The door system of claim 1, wherein the second refeed block includes a bottom edge that is to protrude outward from an outer surface of the second track wall, the bottom edge of the second refeed block being rounded.

7. The door system of claim 1, further including a side plate, the first and second refeed blocks to be mounted to the side plate via fasteners.

8. The door system of claim 7, wherein the first and second refeed blocks include at least one of countersunk holes or counterbored holes for the fasteners so that the fasteners do not protrude from an outer surface of the first and second refeed blocks.

9. The door system of claim 1, wherein the first and second refeed blocks are made from flat bars of metal welded to a side plate.

10. The door system of claim 1, wherein the panel includes an outer surface and an inner surface opposite the outer surface, the outer surface to extend across and face away from a doorway when the panel is in a closed position, the door system including a first portion of a guide member to be mounted on the outer surface of the panel, the first portion to align with an opening in the track along which the panel moves such that a first part of the first portion is inside the channel when the panel is in the closed position and a second part of the first portion is outside the channel; and a second portion of the guide member to be mounted on the outer surface of the panel, the second portion to be entirely inside the channel when the panel is in the closed position, the second portion being distinct and separate from the first portion.

11. The door system of claim 10, wherein the first track wall has a first main portion and a first end portion angled relative to the first main portion, and the second track wall has a second main portion and a second end portion angled relative to the second main portion, a third distance between the first and second refeed blocks corresponding to a fourth distance between the first and second main portions of the first and second track walls, the first and second end portions angled toward one another to define a fifth distance therebetween corresponding to the opening in the track through which the panel extends when in the closed position, the fifth distance less than the third and fourth distances.

12. The door system of claim 11, wherein upper ends of the first and second end portions are tapered relative to upper ends of the first and second main portions to define a V-shaped entry into the opening.

13. The door system of claim 1, further including a bottom seal assembly, the bottom seal assembly including:

a weighted tube to be carried by the panel; and a loop seal to surround the weighted tube and a bottom edge of the panel.

14. The door system of claim 1, wherein the first and second refeed blocks are distinct from one another and separately mountable adjacent to the track.

15. The door system of claim 1, further including a lateral retention tab to be coupled to a side of the panel facing either the first track wall or the second track wall, the lateral retention tab including:

a first surface to face toward the panel;

a second surface to face away from the panel;

first and second edges, the first edge to be proximate a lateral edge of the panel, the second edge opposite the first edge so as to be closer to a center of the panel than the first edge is to the center of the panel; and a protrusion that is to extend from the second surface in a direction away from the panel, the protrusion closer to the second edge than the protrusion is to the first edge.

* * * * *